(12) United States Patent
Lampkins et al.

(10) Patent No.: US 10,083,310 B1
(45) Date of Patent: *Sep. 25, 2018

(54) SYSTEM AND METHOD FOR MOBILE PROACTIVE SECURE MULTI-PARTY COMPUTATION (MPMPC) USING COMMITMENTS

(71) Applicant: HRL Laboratories, LLC, Malibu, CA (US)

(72) Inventors: Joshua D. Lampkins, Gardena, CA (US); Karim El Defrawy, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/207,483

(22) Filed: Mar. 12, 2014

Related U.S. Application Data

(60) Provisional application No. 61/780,757, filed on Mar. 13, 2013.

(51) Int. Cl.
*G06F 21/00* (2013.01)
*G06F 21/60* (2013.01)

(52) U.S. Cl.
CPC ................... *G06F 21/606* (2013.01)

(58) Field of Classification Search
CPC ...... G06F 21/606; H04L 9/321; H04L 63/065
USPC .......................................................... 726/26
See application file for complete search history.

(56) References Cited

U.S. PATENT DOCUMENTS

| | | | | |
|---|---|---|---|---|
| 5,625,692 | A * | 4/1997 | Herzberg et al. | 380/286 |
| 6,035,041 | A | 3/2000 | Frankel et al. | |
| 7,003,677 | B1 * | 2/2006 | Herzberg et al. | 713/180 |
| 7,313,701 | B2 * | 12/2007 | Frankel | G06Q 20/382 705/64 |
| 8,824,672 | B1 * | 9/2014 | Gomathisankaran | G06F 11/30 380/29 |
| 2001/0038696 | A1 * | 11/2001 | Frankel | G06Q 20/382 380/286 |
| 2010/0037055 | A1 * | 2/2010 | Fazio et al. | 713/171 |

OTHER PUBLICATIONS

Ham, Lein, and Changlu Lin. "Strong (n, t, n) verifiable secret sharing scheme." Information Sciences 180.16 (2010): 3059-3064.*

(Continued)

*Primary Examiner* — Syed Zaidi
(74) *Attorney, Agent, or Firm* — Tope-McKay & Associates

(57) ABSTRACT

Described is a system for mobile proactive secure multiparty computation using commitments. The system generates, at each server, secret sharings for each of its input gates using a Secret-Share protocol. Thereafter, sharings of inputs are generated for random gates using a GenPoly protocol. Sharings of multiplication triples are then generated for multiplication gates using a Multiplication-Triple protocol. Affine gates are then evaluated. Multiplication gates can then be evaluated using the multiplication triples and implementing a Secret-Open protocol. A Secret-Redistribute protocol is used to re-randomize the secret sharing. The Secret-Open protocol is implemented after a sharing for an output gate has been computed to reveal the secret.

15 Claims, 4 Drawing Sheets

(56) References Cited

OTHER PUBLICATIONS

Bai, Li, and XuKai Zou. "A proactive secret sharing scheme in matrix projection method." International Journal of Security and Networks 4.4 (2009): 201-209.*

Damgård, Ivan, and Jesper Buus Nielsen. "Scalable and unconditionally secure multiparty computation." Advances in Cryptology—CRYPTO 2007. Springer Berlin Heidelberg, 2007. 572-590.*

Cachin, Christian, et al. "Asynchronous verifiable secret sharing and proactive cryptosystems." Proceedings of the 9th ACM conference on Computer and communications security. ACM, 2002.*

Zuzana Beerliova-Trubiniova and Martin Hirt. Efficient multi-party computation with dispute control. In TCC, pp. 305-328, 2006.

Ivan Damg_ard and Jesper Buus Nielsen. Scalable and unconditionally secure multiparty computation. In CRYPTO, pp. 572-590, 2007.

Amir Herzberg, Stanislaw Jareoki, Hugo Krawczyk, and Moti Yung. Proactive secret sharing or: How to cope with perpetual leakage. In CRYPTO, pp. 339-352, 1995.

Rafail Ostrovsky and Moti Yung. How to withstand mobile virus attacks. In In Proceedings of the tenth annual ACM symposium on Principles of distributed computing, pp. 51-59. ACM Press, 1991.

Torben P. Pedersen. Non-interactive and information-theoretic secure verifiable secret sharing. In Joan Feigenbaum, editor, CRYPTO, vol. 576 of Lecture Notes in Computer Science, pp. 129-140. Springer, 1991.

David Schultz. Mobile Proactive Secret Sharing. PhD thesis, Massachusetts Institute of Technology, 2007.

Adi Shamir. How to share a secret. Commun. ACM, 22(11):612-613, 1979.

Alfred V. Aho, John E. Hopcroft, and J. D. Ullman. The Design and Analysis of Computer Algorithms. Addison-Wesley, pp. 299-300, 1974.

Office Action 1 for U.S. Appl. No. 14/449,868 dated Aug. 13, 2015.

Bai, Li, and XuKai Zou, "A proactive secret sharing scheme in matrix projection method," International Journal of Security and Networks 4.4 (2009), pp. 201-209.

Harn, Lein, and Changlu Lin, "Strong (n, t, n) verifiable secret sharing scheme," Information Sciences 180.16 (2010), pp. 3059-3064.

Office Action 1 Response for U.S. Appl. No. 14/449,868 dated Dec. 10, 2015.

Office Action 2 for U.S. Appl. No. 14/449,868 dated Jan. 29, 2016.

Vaclav E. Benes. Optimal rearrangeable multistage connecting networks. The Bell System Technical Journal, 43 (4)1641-1656, Jul. 1964.

Elwyn R. Berlekamp. Algebraic Coding Theory. Aegean Park Press, 1984, Chapter 7.

Michael Ben-Or, Shafi Goldwasser, and Avi Wigderson. Completeness theorems for non-cryptographic-fault-tolerant distributed computation (extended abstract). In STOC, pp. 1-10, 1988.

Gabriel Bracha. An O(log n) expected rounds randomized byzantine generals protocol, J. ACM, 34(4):910-920, 1987.

Eli Ben-Sasson, Serge Fehr, and Rafail Ostrovsky. Near-linear unconditionally-secure multiparty computation with a dishonest minority. Cryptology ePrint Archive, Report 2011/629, 2011.

Zuzana Beerliova-Trubiniova and Martin Hirt. Efficient multi-party computation with dispute control. In TCC, pp. 305-328, 2006.

Zuzuna Beerliove-Trubiniova and Martin Hirt. Perfectly-secure mpc with linear communication complexity. InTCC, pp. 213-230, 2008.

Ivan Ddamgard, Yuval Ishai, Mikkel Kroigaard, Jasper Buus Nielsen, and Adam Smith. Scalable multiparty computation with nearly optimal work and resilience. In CRYPTO, pp. 241-261, 2008.

Ivan Damgard, Yuval Ishai, and Mikkel Kroigaard. Perfectly secure multiparty computation and the computational overhead of cryptography. In EUROCRYPT, pp. 445-465, 2010.

Ivan Damgard and Jasper Buus Nielsen, Scalable and unconditionally secure multiparty computation. In CRYPTO, pp. 572-590, 2007.

Michael J. Fischer and Nancy A. Lynch. A lower bound for the time to assure interactive consistency. Inf. Process Lett., 14(4):183-186, 1982.

Matthew K. Franklin and Moti Yung. Communication complexity of secure computation (extended abstract). In STOC, pp. 699-710, 1992.

Shuhong Gao. A new algorithm for decoding reed•solomon codes. In Communications, Information and Network Security, Editors V.Bhargava, H.V.Poor, V. Tarokh, and S.Yoon, pp. 55-68. Kluwer, 2002.

Craig Gentry, Shai Halevi, and Nigel P. Smart. Fully homomorphic encryption with polylog overhead, In EURO-CRYPT, pp. 465-482, 2012.

Juan A. Garay and Yoram Moses. Fully polynomial byzantine agreement in t+1 rounds. In STOC, pp. 31-41, 1993.

Frank Thomson Leighton. Introduction to parallel algonthms and architectures: arrays, trees, hypercubes. Morgan Kaufmann, 1992, section 3.2.

Rafail Ostrovsky and Moti Yung. How to withstand mobile virus attacks (extended abstract). In PODC, pp. 51-59, 1991.

Abraham Waksman. A permutation network. J. ACM, 15(1):159-163, 1968.

* cited by examiner

SYSTEM AND METHOD FOR MOBILE PROACTIVE SECURE MULTI-PARTY COMPUTATION (MPMPC) USING COMMITMENTS

CROSS-REFERENCE TO RELATED APPLICATIONS

This is a non-provisional patent application of U.S. Provisional Application No. 61/780,757, filed on Mar. 13, 2013, entitled, "Efficient Protocol for Mobile Proactive Secure Multiparty Computation (MPMPC) Using Commitments."

FIELD OF INVENTION

The present invention relates to a security system and, more particularly, to a security system that employs a mobile proactive secure multiparty computation protocol.

BACKGROUND OF INVENTION

Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol.

Although there are numerous published MPC protocols, none of the published protocols allow a set of servers to change in the middle of a computation, in what would be considered proactive. The only previous work on a proactive MPC is the work of Rafail Ostrovsky and Moti Yung in "How to withstand mobile virus attacks," In *In Proceedings of the tenth annual ACM symposium on Principles of distributed computing*, pages 51-59. ACM Press, 1991, which is hereby incorporated by reference as though fully set forth herein. A disadvantage of their protocol is that it is not explicit, in that it does not provide the details of each step to perform and required computations and communication (i.e., the paper only provides a high level argument and description of why it is possible to construct such a protocol). The protocol of Ostrovsky and Yung is also inefficient. The efficiency is not explicitly stated, but it is at least $\Omega(DCn^3)$ (where D) is the circuit depth, C is the number of gates in the circuit and n is the number of servers). Finally, their protocol is non-mobile (i.e., the set of servers in Ostrovsky and Yung's protocol is fixed and cannot be changed during the computation).

Thus, a continuing need exists for an efficient protocol for mobile proactive security multiparty computation.

SUMMARY OF INVENTION

Described is a system, method, and computer program product for mobile proactive The memory is a non-transitory computer-readable medium having executable instructions encoded thereon, such that upon execution of the instructions, the one or more processors performs several operations, including any or all of the operations described herein (or any combination thereof). As a non-limiting example, the system generates, at each server, secret sharings for each of its input gates using a Secret-Share protocol. Thereafter, sharings of inputs are generated for random gates using a GenPoly protocol. Sharings of multiplication triples are then generated for multiplication gates using a Multiplication-Triple protocol. Affine gates are then evaluated. Multiplication gates can then be evaluated using the multiplication triples and implementing a Secret-Open protocol. A Secret-Redistribute protocol is used to re-randomize the secret sharing. The Secret-Open protocol is implemented after a sharing for an output gate has been computed to reveal the secret.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
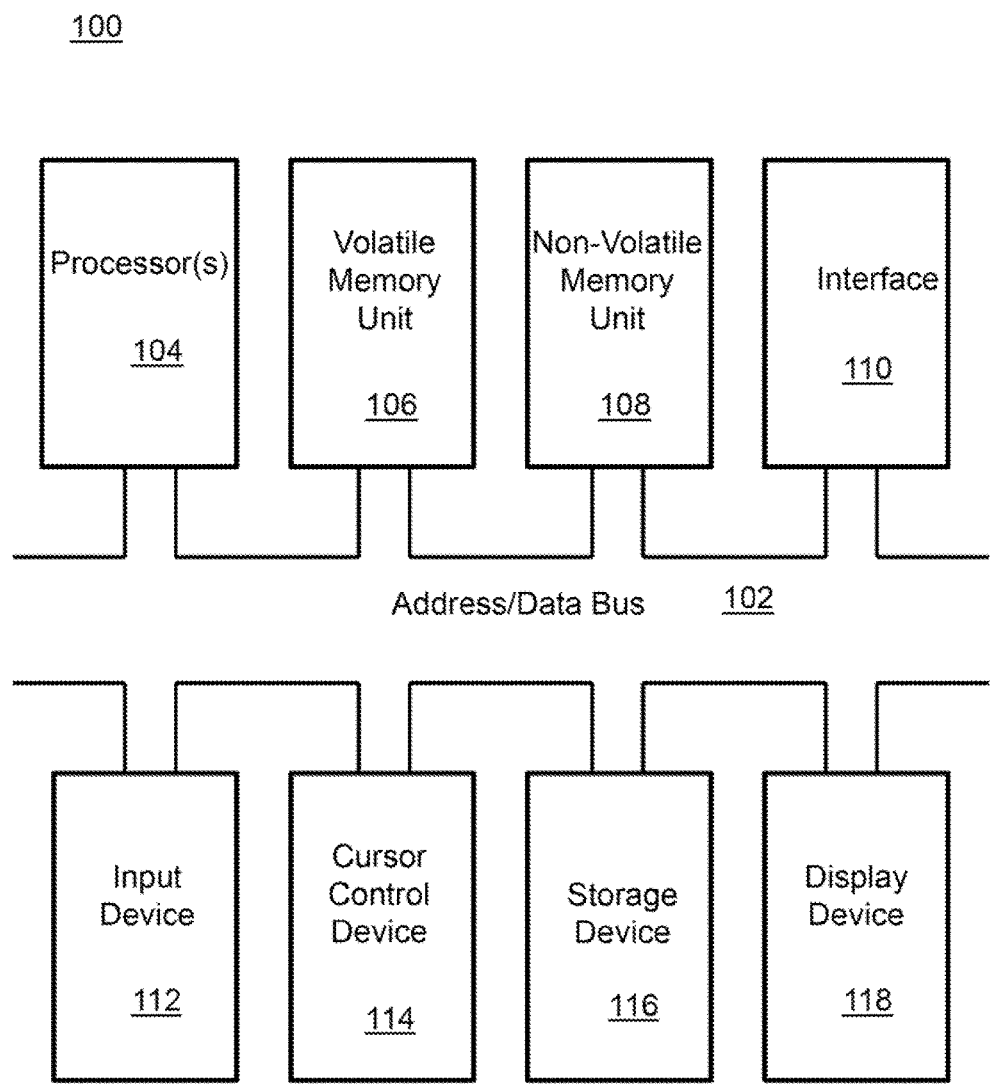
FIG. 1 is a block diagram depicting the components of a system according to the principles of the present invention.

The present invention relates to a security system and, more particularly, to a security system that employs a mobile proactive secure multiparty computation protocol. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references is provided. Next, a description of the various principal aspects of the present invention is provided. Subsequently, an introduction provides the reader with a general understanding of the present invention. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Eli Ben-Sasson, Serge Fehr, and Rafail Ostrovsky. Near-linear unconditionally-secure multiparty computation with a dishonest minority. Cryptology ePrint Archive, Report 2011/629, 2011.
2. Zuzana Beerliova-Trubiniova and Martin Hirt. Efficient multi-party computation with dispute control. In *TCC*, pages 305-328, 2006.
3. Ivan Damgard and Jesper Buus Nielsen. Scalable and unconditionally secure multiparty computation. In *CRYPTO*, pages 572-590, 2007.
4. Amir Herzberg, Stanislaw Jarecki, Hugo Krawczyk, and Moti Yung. Proactive secret sharing or: How to cope with perpetual leakage. In *CRYPTO*, pages 339-352, 1995.
5. Rafail Ostrovsky and Moti Yung. How to withstand mobile virus attacks. In *Proceedings of the tenth annual ACM symposium on Principles of distributed computing*, pages 51-59. ACM Press, 1991.
6. Torben P. Pedersen. Non-interactive and information-theoretic secure verifiable secret sharing. In *CRYPTO*, volume 576 of *Lecture Notes in Computer Science*, pages 129-140. Springer, 1991.
7. David Schultz. *Mobile Proactive Secret Sharing*. PhD thesis, Massachusetts Institute of Technology, 2007.
8. Adi Shamir. How to share a secret. *Commun. ACM*, 22(11):612-613, 1979.

(2) PRINCIPAL ASPECTS

The present invention has three "principal" aspects. The first is mobile proactive secure multi-part computation system using commitments. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
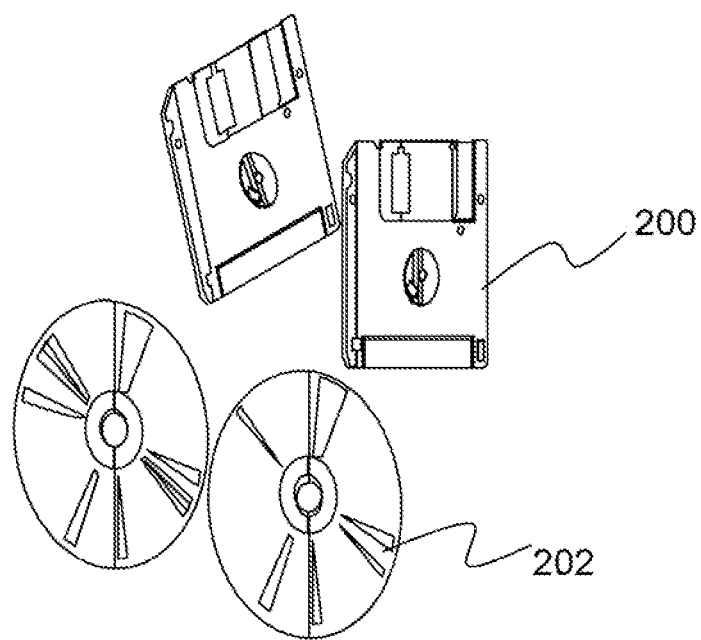
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Described is a mobile proactive secure multiparty computation protocol (MPMPC). Multiparty computation (MPC) allows a group of servers (sometimes called players or parties) to provide inputs to an arithmetic (or Boolean) circuit and securely evaluate the circuit in the presence of an adversary who may corrupt a fixed portion of the servers. When the adversary corrupts a server, it learns all information stored on that server. The adversary can force corrupt servers to behave arbitrarily, irrespective of the protocol. Here, when it is stated that the circuit is evaluated "securely," it is meant that the adversary does not learn anything about the inputs of the uncorrupted servers, except what can be deduced from the output of the circuit (which is known to all servers), and that the output of the circuit is correct.

Proactive MPC (or PMPC) is an MPC protocol which still evaluates the circuit securely when the adversary is allowed to corrupt any number of servers, so long as no more than a fixed portion of the servers are corrupt at any given time. Servers are periodically refreshed, and as long as the adversary did not compromise a number of servers larger than the threshold between two consecutive refreshes, the computation is guaranteed to be secure.

Mobile PMPC (or MPMPC) according to the principles of the present invention is a PMPC protocol which allows the set of servers performing the computation to change in the middle of the computation. MPMPC provides more flexibility since new servers can be added to the set of servers running the protocol; adding more servers forces the adversary to have to compromise a larger number of servers before it can successfully break the security of the computation. Note that the threshold as a fraction of the total number of servers does not change, what changes is the absolute number of servers that have to be compromised before breaking security.

The MPMPC protocol can be used to perform any form of computation that can be represented by an arithmetic circuit (over a finite field) in a secure and resilient manner. Such a protocol can be used for various forms of computations, including but not limited to storing and performing computation (and/or data mining, querying, searching, and updating) for a distributed database and securing distributed control systems. The protocol can also be used to securely perform computations such as online auctioning and secure voting. The MPMPC protocol could also be used to realize a resilient and secure control plane to operate, monitor and ensure correct behavior of a cloud computing infrastructure. For example, the protocol can be implemented in a system to allow a vehicle to distribute sensitive data (such as location, speed, and mileage) among a cloud to perform diagnostics such that the data remains secure even if some of the servers in the cloud are compromised. As another example, the protocol can be used for distributed computation performed by unmanned aerial vehicles (UAVs). For instance, in a group of UAVs collecting data, each individual UAV could distribute the data it collects among the group, and the group could then perform computations on the data. The protocol would ensure that capturing or destroying some fraction of the UAVs does not reveal any hidden data or disrupt the computation.

(4) SPECIFIC DETAILS OF THE INVENTION

Figure 3:
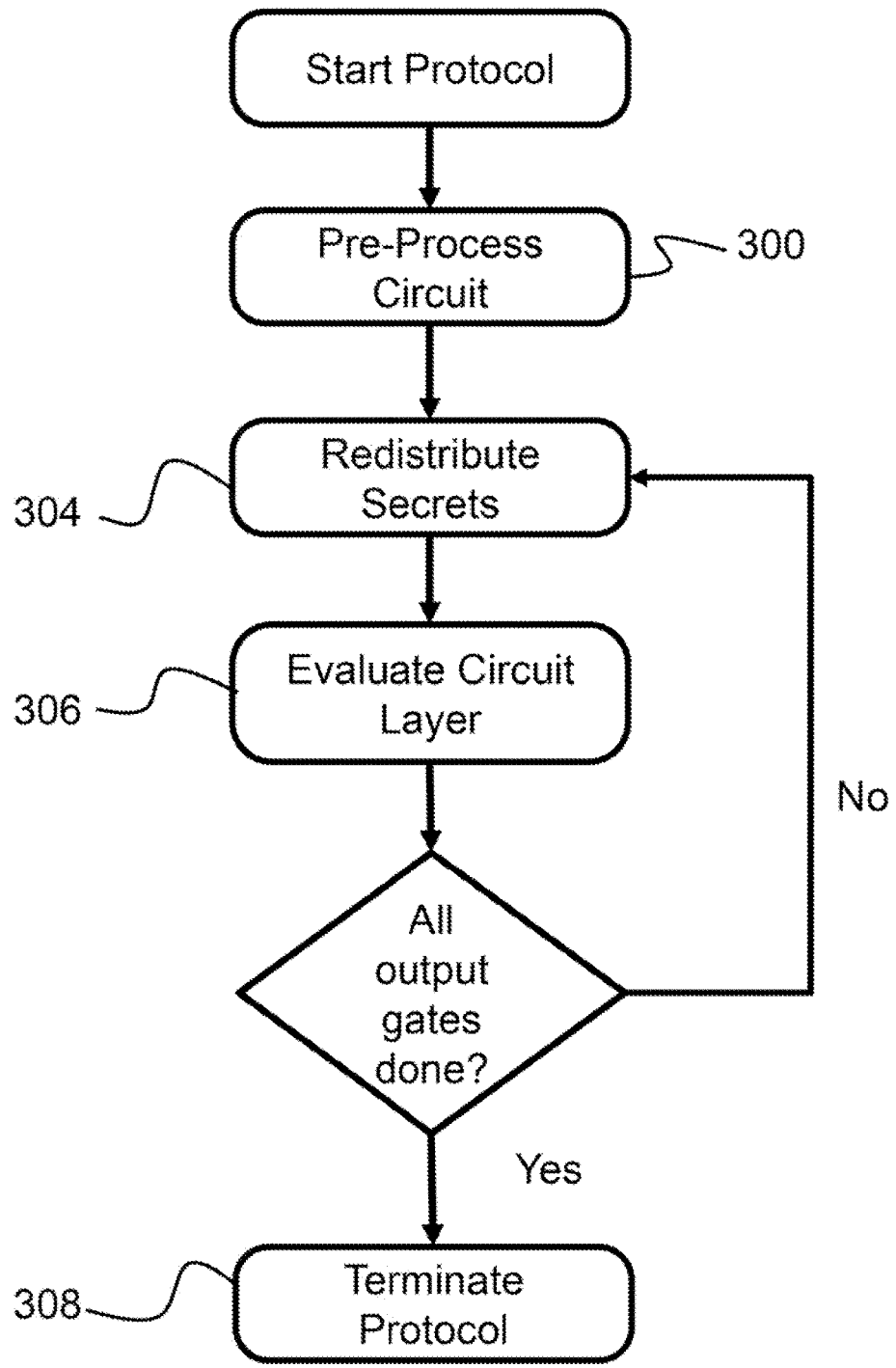
FIG. 3 is flowchart depicting a process according to the principles of the present invention.

As described above, the present invention is directed to a system that implements a mobile proactive secure multiparty computation protocol (MPMPC) for the sharing of secrets. Generally speaking and as shown in the flowchart of FIG. 3, after the protocol is initialized, the circuit is pre-processed 300. Thereafter, secrets are redistributed 302, with the circuit subsequently evaluated 304, layer by layer. If all output gates are completed, then the protocol is terminated 306. Alternatively, if the output gates are not done, then the shares are redistributed 302 for further evaluation. Each of these processes and sub-protocols are described in further detail below. However, before describing the protocol in detail, it is helpful to have a preliminary understanding of the terminology, symbol designations, and some utilized procedures. Thus, provided below is a preliminary description of the foundation for implementing the protocols according to the principles of the present invention.

First, the system is directed to a set of servers P, which may change over the course of the protocol. The system redistributes (i.e., refresh) the secrets (and hence the entire computation) periodically throughout the protocol. The period between adjacent redistributions is called a stage. Also, the period before the first redistribution is a stage, and the period after the last redistribution is a stage.

n denotes the number of servers and $P=\{P_i\}_{\{i=1\}}^n$. t denotes the threshold of corruption (i.e., the maximum number of servers the adversary may corrupt during the current stage). The adversary may adaptively corrupt and de-corrupt servers at will, so long as the number of corruptions per stage does not exceed the threshold. Any server that is corrupt during a secret redistribution is considered to be corrupt in both adjacent stages. It is required that $t<n/(2+\epsilon)$ at each stage for some fixed constant $\epsilon>0$. For example, $$n = 2\left\lfloor \frac{2+\varepsilon}{2}t \right\rfloor + 5.$$

n is allowed to fluctuate throughout the course of the protocol, but it is assumed that there is some upper bound on n. Corr is used to denote a set of servers that are known by everyone (i.e., the system participants) to be corrupt. Initially, it is assumed that Corr=Ø.

Further, an synchronous network model with a secure broadcast channel is assumed and point-to-point communications will not be used. Secure erasure is also assumed, meaning that each server can erase its data in such a way that if the adversary later corrupts that server, the adversary cannot feasibly learn any information on what was erased.

Although other secret sharing schemes may be used, for convenience and illustrative purposes and as a non-limiting example, the secret sharing scheme used to in this description is based on Shamir's secret sharing scheme (see the List of Incorporated Cited Literature References, Literature Reference No. 8). In Shamir's secret sharing scheme, the shares of a secret are points on a polynomial, the constant term of the polynomial being the secret. It is denoted by d the degree of the polynomial used to distribute the secret. So knowing any d+1 points on the polynomial allows one to interpolate the secret, but knowing d or fewer points does not reveal any information about the secret. Normally, MPC protocols that use Shamir secret sharing set d=1. However, for the protocol according to the principles of the present invention, it is required that d≥t+2. Thus, it is set such that $$d = \left\lfloor \frac{2+\varepsilon}{2}t \right\rfloor + 2.$$

As a consequence, n=2d+1.

The secrets will be shared using Pedersen commitments. See Literature Reference No. 6 for an understanding of Pedersen commitments. To that end, let p be a large prime, and let q be a prime such that p=mq+1 for some small integer m. A circuit can be denoted as Circ, which is an arithmetic circuit over $Z_q$. Let G be the cyclic group of order p and let g be an element of order q. Furthermore, let h∈{g} such that no server knows $\log_g h$. If it is desirable to share a secret with polynomial $u \in Z_q[x]$ (i.e., u(0) is the secret), then create an auxiliary polynomial $v \in Z_q[x]$. Letting a, denote the evaluation point of $P_i$, each server $P_i$ receives his share $u(\alpha_i)$ of the secret, together with $v(\alpha_i)$. Let $u_k$ denote the coefficient of $x^k$ in u(x) (and similarly for $v_k$). Then when the secret is shared, the values $g^{u_k}h^{v_k}$ are broadcast for each k. This means that $g^{u(\alpha_i)}h^{v(\alpha_i)}$ are also public knowledge (as they can be computed from the $g^{u_k}h^{v_k}$). This allows servers to verify that the shares they received are consistent with the commitments broadcast by the dealer. Assuming the discrete logarithm problem is computationally infeasible, this provides a perfectly hiding and computationally binding verifiable secret sharing scheme.

In the context of redistributing shares from one group to another, the labels n, t, d, u, and v (as described above) are used for the old group and the labels n', t', d', u', and v' are used for the corresponding variables/polynomials in the new group. The old group is denoted by $P=\{P_i\}_{i=1}^n$ and the new group by $P'=\{S_i\}_{i=1}^{n'}$. $\alpha_i$ is used to denote the evaluation point of $P_i$ and $\beta_j$ is used to denote the evaluation point of $S_j$. This is not as notationally clean as just using i and j for the (respective) evaluation points, but the protocol requires that $\alpha_i \neq \beta_j$ for all i,j, so this is necessary. Thus, the share of server $P_i$ (in the old group) is $u(\alpha_i)$, and similarly the share of server $S_j$ (in the new group) is u'(\beta_j).

It is assumed that each server has a public key encryption scheme, such that the encryption of a MESSAGE for server $P_i$ is denoted as $ENC_{P_i}$ (MESSAGE). Each server also has a signature scheme, with $P_i$'s signature for the MESSAGE being denoted as $SIG_{P_i}$ (MESSAGE). RAND is used to denote an arbitrary random value.

Finally and as a central resource for the reader, provided below is a table of symbols that are used in the description of the protocol.

| | |
|---|---|
| P | The set of servers currently on-line and engaged in the protocol |
| n | The number of servers currently engaged in the protocol. |
| t | The maximum number of servers that a malicious party can corrupt without revealing the secret. This is called the threshold of corruption. |
| d | The degree of the polynomial used to share the secret. |
| P', n', t', d' | Same as above, except that these are for the new set of servers. |
| Corr | The set of servers known by every server to be corrupt. |
| g, h | Group elements used for Pedersen commitments. |
| $P_i$ | A server in P. |
| $\alpha_i$ | The evaluation point of server $P_i$. This determines which shares of the secret $P_i$ will get. |
| $S_j$ | A server in P'. |
| $\beta_j$ | The evaluation point of server $S_j$. |
| $ENC_{P_i}$ (M) | The encryption of message M using server $P_i$'s public key. |
| $SIG_{P_i}$ (M) | Server $P_i$'s signature for message M. |
| $Z_q$ | The (unique) finite field with q elements. |
| C | The size of the circuit (defined as the total number of gates). |
| D | The multiplicative depth of the circuit. |
| RAND | An arbitrary random value. |

(4.1) General Protocol Overview

The protocol proceeds as follows: First, each server generates sharings for each of its input gates using the protocol Secret-Share. Sharings of inputs for random gates are generated using a GenPoly protocol. A Multiplication- Triple protocol with random sharings (created using the GenPoly protocol) is invoked to generate sharings of multiplication triples (i.e., sharings of three values a, b, and c, such that c=ab). After this initial setup has been done, the servers compute the circuit layer-by-layer. Affine gates can be evaluated via local computations. Multiplication gates can be evaluated using the prepared multiplication triples and invoking a Secret-Open protocol. After each layer of the circuit is evaluated, the servers run a Secret-Redistribute protocol to re-randomize the secrets, thereby preserving privacy of the stored values. Once a sharing for an output gate has been computed, the servers invoke the Secret-Open protocol to reveal the secret or sharing. Once all the outputs have been revealed, the protocol is complete.

(4.2) Circuit Evaluation

A gate is said to be evaluated if a sharing of its output has been distributed. A gate is called ready if all its input gates have already been evaluated. The circuits are evaluated in stages, and at each stage all ready gates are evaluated. Note that affine gates can be computed locally without any communication, so the number of stages needed to evaluate the circuit is solely dependent on the multiplicative depth of the circuit. The multiplicative depth is denoted as D).

Described below is the main protocol, MPC. The MPC protocol uses several sub-protocols, which are defined later. For the invocation of the Secret-Redistribute protocol, it is assumed that some trusted third party (such as a network administrator) determines who the new group of shareholders will be.

The MPC(t, P, Circ) protocol is as follows:

Set Corr=Ø and invoke a Pre-Process (t, P, Corr, Circ) protocol. Repeat the following steps until all output gates have been evaluated.

1. Invoke Secret-Redistribute for each stored secret. Update P accordingly.
2. Evaluate each ready multiplication/output gate as follows.
    2.1. For each multiplication gate in parallel, do the following:
        2.1.1. Denote the multiplication triple associated with the multiplication gate by ([a], [b], [c]) (i.e., c=ab), and denote the inputs by [x] and [y]. Locally compute $[\alpha]=[x]+[a]$ and $[\beta]=[y]+[b]$.
        2.1.2. Invoke Secret-Open(t, P, $[\alpha]$) and Secret-Open (t, P, $[\beta]$) in parallel.
        2.1.3. Locally compute the output of the multiplication gate as $\alpha\beta-\alpha[b]-\beta[a]+[c]$.
    2.2. For each output gate, invoke Secret-Open in parallel.
3. For each ready affine gate, each server performs the affine operations on its shares locally (see Section 4.4 for further details).

The Communication complexity of MPC is $O(DCn^2)$. It takes 20+7D rounds of communication if steps 2.1.2 and 2.2 are nm in parallel.

(4.4) Secret Sharing, Redistribution, and Opening

A sharing of a secret s is denoted by [s]. Note that the servers can perform affine operations on secrets locally by performing the corresponding operations on their shares. For instance, suppose secrets $s^{(1)}, \ldots, s^{(l)}$ have been shared and the servers want to compute a sharing of $$r = a^{(0)} + \sum_{j=1}^{l} a^{(j)} s^{(j)}$$

for some publicly known constants $a^{(0)}, \ldots, a^{(l)}$. Writing server $P_i$'s share of s(j) as $s_i^{(j)}$, $P_i$ can compute its share $r_i$ of r as $$r_i = a^{(0)} + \sum_{j=1}^{l} a^{(j)} s_i^{(j)}.$$

If all the servers perform this operation locally, this operation can be written as $$[r] = a^{(0)} + \sum_{j=1}^{l} a^{(j)} [s^{(j)}].$$

Since the system is using Pedersen commitments, these operations also have to be performed for the auxiliary polynomial, and corresponding operations must be performed on the commitments to each polynomial.

(4.4.1) Secret-Sharing

The following Secret-Share (t, $P_D$, s, P, Corr) protocol allows a dealer $P_D$ to share a secret s using Pedersen commitments.

I. Share/Commitment Distribution
   1.1. $P_D$ picks a random degree d−1 polynomial ũ(x) and sets $u(x)=s+x\tilde{u}(x)=u_0+u_1x+ \ldots +u_dx^d$. $P_D$ also picks a random degree d polynomial $v(x)=v_0+v_1x+ \ldots +v_dx^d$.
   1.2. $P_D$ computes $\in_k = g^{u_k} h^{v_k}$ for each k=0, . . . , d and broadcasts $VSS_{P_D}=(D,\{ENC_{P_i}[u(\alpha_i),v(\alpha_i)]\}_{i=1}^{n}$, $\{\in_k\}_{k=0}^{d})$
   as well as $SIG_{P_D}(VSS_{P_D})$.

2. Error Detection
   2.1. Each $P_i \notin$ Corr decrypts the message sent by $P_D$ to find $u(\alpha_i),v(\alpha_i)$ and verifies that $$g^{u(\alpha_i)} h^{v(\alpha_i)} = \Pi_{k=0}^{d}(\in_k)^{\alpha_i^k}.$$

2.2. Any $P_i \in$ Corr who detected a fault in Step 2.1 broadcasts $ACC_{P_i}=(i, \text{accuse}, D, RAND)$ and $SIG_{P_i}(ACC_{P_i})$.
   2.3. For each properly signed accusation (from server $P_i$) made in Step 2.2, $P_D$ broadcasts $(D,\text{defense},i,[u(\alpha_i),v(\alpha_i)],RAND_i)$, where $RAND_i$ is the randomness that was used to encrypt the message for $P_i$ in Step 1.2.
   2.4. Each server checks to see if the defenses broadcast in Step 2.3 are correct (i.e., the defense was well-formed, the pair encrypts to the same message broadcast in Step 1.2 when the given randomness is used, and the pair passes the check in Step 2.1). For each accusation that was rebutted with a correct defense, the accuser is added to Corr. If any accusation was not correctly rebutted, $P_D$ is added to Corr (It should be noted that an adversary can generate spurious defenses that do not pass the required checks, so the servers only look to see if there is any correct defense). This also applies to all later protocols that utilize accusation/defense. If $P_D$ is not found to be corrupt, the protocol terminates successfully.

The communication complexity of Secret-Share is O(n) field elements. It takes 3 rounds of communication. Multiple instances of Secret-Share can be run in parallel without affecting the round complexity. Note that the protocol does not necessarily terminate successfully if the dealer is corrupt. For the MPC protocol to work, a trusted setup phase is required.

(4.4.2) Generating Random Polynomials

Let V be a Vandermonde matrix with n rows and n–t columns, and let $M=V^T$. Suppose that x is an n-dimensional vector with n–t of its coordinates having a uniformly random distribution and the other t coordinates having an arbitrary distribution independent of the n–t coordinates. It was shown in Literature Reference No. 3, that under these assumptions, all the coordinates of Mx have a uniformly random distribution. It is assumed that there is a publicly known M, fixed for each stage of the protocol. Since the size of M is dependent on n and t, one might have to change it between stages. This does not actually add to the overall complexity of the protocol, because assuming there is an upper bound on n, a matrix can be generated for this maximal n and then at each stage a truncated version of the matrix of the matrix can be used, which can be achieved simply by removing some rows and columns from the matrix.

Described below is a protocol for creating l random polynomials with Pedersen commitments in parallel. This protocol generates polynomials of degree D. Note that it may be possible to have D≠d. The secrets are generated in batches of size n–t, so if l is not a multiple of n–t, it is desirable to generate some additional polynomials.

The GenPoly (t, P, Corr, l, D) protocol proceeds as follows:

1. Proposal Distribution
   1.1. Define l=⌈l/(n–t)⌉. Each server $P_i \in$ Corr generates 2l' random polynomials $\{(Q_i^{(k)}, \gamma_i^{(k)})\}_{k=1}^{l'}$, with deg $Q_i^{(k)}=$ deg $\gamma_i^{(k)}=D$, which can be written as $Q_i^{(k)}(x)=q_{i,0}^{(k)}+q_{i,1}^{(k)}x+\ldots+q_{i,D}^{(k)}x^D$ (and the coefficients for $\gamma_i^{(k)}$ are similarly $\gamma_{i,j}^{(k)}$).
   1.2. Each server $P_i \notin$ Corr computes $\in_{i,j}^{(k)}=g^{q_{ij}^{(k)}}h^{\gamma_{ij}^{(k)}}$. Then $P_i$ broadcasts $$VSS_{P_i} = \left(i, \{\{ENC_{P_m}[Q_i^{(k)}(\alpha_m), \gamma_i^{(k)}(\alpha_m)]\}_{m=1}^n, \{\in_{i,j}^{(k)}\}_{j=0}^D\}_{k=1}^{l'}\right)$$

and $SIG_{P_i}(VSS_{P_i})$.
   1.3. Each server that did not produce a properly signed message in the previous step is added to Corr.

2. Error Detection
   2.1. Each server $P_i \notin$ Corr checks for each pair $[Q_m^{(k)}(\alpha_i), \gamma_m^{(k)}(\alpha_i)]$ received in the previous step that $$g^{Q_m^{(k)}(\alpha_i)}h^{\gamma_m^{(k)}(\alpha_i)}?=\Pi_{j=0}^D(\in_{m,j}^{(k)})^{\alpha_i^j}.$$

2.2. If server $P_i$ detected an error in the previous step with the pair $[Q_m^{(k)}(\alpha_i), \gamma_m^{(k)}(\alpha_i)]$, the server broadcasts $ACC_{P_i}=(i,$ accuse, m, k) and $SIG_{P_i}(ACC_{P_i})$. $P_i$ broadcasts an accusation no more than once for each $P_m$, although there may be more than one accusation per k.
   2.3. If server $P_i$ was accused (with a properly signed accusation) in the previous step, the server broadcasts its (purported) pair of values along with the randomness $RAND_{i,m,k}$ that was used to encrypt it in Step 1.2:

$$(i, \text{defense}, m[Q_i^{(k)}(\alpha_m), \gamma_i^{(k)}(\alpha_m)], RAND_{i,m,k}).$$

2.4. Each server checks to see if the defenses broadcast in Step 2.3 are correct (i.e., the defense was well-formed, the pair encrypts to the same message broadcast in Step 1.2 when the given randomness is used, and the pair passes both checks in Step 2.1). For each accusation that was rebutted with a correct defense, the accuser is added to Corr. For each accusation that was not correctly rebutted, the accused server is added to Corr.

3. Local Share Manipulation
   3.1. For each $P_i \notin$ Corr and each k, $Q_i^{(k)}$ is defined to be the all-zero polynomial. Each batch k of n polynomials is converted into a batch of n–t polynomials as follows:

$$(R^{((k-1)(n-t)+1)}, R^{((k-1)(n-t)+2)}, \ldots, R^{(k(n-t))})=M(Q_1^{(k)}, Q_2^{(k)}, \ldots, Q_n^{(k)})^T.$$

(The $\gamma^{(k)}$ is similarly used to construct the auxiliary polynomials for the $R^{(s)}$.) Each server locally computes the Pedersen commitments for these polynomials. The output is the set of shares of $\{R^{(s)}\}_{s=1}^l$, along with the shares of the corresponding auxiliary polynomials.

The communication complexity of the GenPoly protocol is $O(l'n^2)=O(ln+n^2)$ field elements (assuming that D=O(n)). It takes 3 rounds of communication. Note that multiple instances of GenPoly can be invoked in parallel, even if the degrees of the generated polynomials are different.

(4.4.3) Secret Redistribution

The following protocol allows the system to redistribute a secret to a new set of servers. By invoking this protocol multiple times in parallel, the entire computation may be transferred to a new set of servers. It is described in such a way that the set of old servers (P) and the set of new servers (P') are disjoint. However, it can easily be adapted to allow some (or all) of the servers in the old group to be in the new group. This is done as follows: Each server $P_i$ from the old group who is to be included in the new group is given a new identity $S_j$, complete with new encryption and signature schemes $ENC_{S_j}, SIG_{S_j}$. In essence, there is one real server in control of two virtual servers $P_i$ and $S_j$. Once the share redistribution is complete, the real server erases all data associated with the virtual server $P_i$ and keeps all data associated with $S_j$.

It is required that $\alpha_i \neq \beta_j$ for all (i,j) (unless $P_i$ and $S_j$ correspond to the same real server). Otherwise, an adversary in control of $P_i$ would know $u(\beta_j)$ and $Q(\beta_j)$, allowing the adversary to determine $u'(\beta_j)$, which is $S_j$'s share of the secret. This would give the adversary an extra evaluation point on u', and might leak the secret.

The Secret-Redistribute (t, P, Corr, t', P', [s]) protocol proceeds as identified below. It is assumed that the secret s has been correctly shared with polynomial u and auxiliary polynomial v (both of degree d) and that the Pedersen commitments for these polynomials are known to all servers in P. Then, proceeding as follows:

1. Polynomial Generation
   Invoke GenPoly(t, P, Corr, n'+1, d'–1) in parallel to generate Q and $\{R^{(j)}\}_{j=1}^{n'}$ of degree d'–1 with auxiliary polynomials $\gamma$ and $\{\zeta^{(j)}\}_{j=1}^{n'}$ (respectively). If the threshold is decreasing (i.e., t'<t and d'<d), also invoke GenPoly(t, P, Corr, 1, d') in parallel with the above invocation to generate W of degree d' with auxiliary polynomial $\xi$. The $k^{th}$ coefficient of Q is $q_k$, and similarly for $R^{(j)}$, W, $\gamma$, $\zeta^{(j)}$, and $\xi$. Note that all servers in P' must be on-line before executing GenPoly so that they can see the broadcast commitments.

2. Lowering the Degree
   If the threshold is decreasing, the following steps are performed.
   2.1. Each server $P_i \notin$ Corr broadcasts $$SH_{P_i}=(u(\alpha_i)+W(\alpha_i), v(\alpha_i)+\xi(\alpha_i)) \text{ and } SIG_{P_i}(SH_{pdi\ i}).$$

2.2. Each server checks that the broadcast shares are correct given the Pedersen commitments, i.e., $$g^{u(\alpha_i)+w(\alpha_i)}h^{v(\alpha_i)+\xi(\alpha_i)}?=g^{u(\alpha_i)}h^{v(\alpha_i)}\Pi_{k=0}^d(g^{w_k}h^{\xi_k})^{\alpha_i^k}.$$

Remember that the commitments $g^{w_k}h^{\xi_k}$ are publicly known, as they were broadcast during the invocation of the GenPoly protocol. Servers who broadcast a faulty share are added to Corr.

2.3. The servers interpolate u+W from the correct shares. Let H denote the highest-order d−d' terms of u+W (i.e., u+W is a degree d polynomial, but u+W−H is a degree d' polynomial). The polynomial u is now replaced with u−H, which lowers the degree of u without changing the secret. The servers (i.e., players) internally update their shares, as well as updating the commitments corresponding to u. The same process is performed (in parallel with the above steps) for v with ξ.

3. Commitment Transfer 3.1. Each server $P_i \in$ Corr broadcasts the commitments for the old secret sharing polynomial for the servers in the new group, i.e. $COM_{P_i} = \{g^{u_k}h^{v_k}\}_{k=1}^{\alpha^i}$ and $SIG_{P_i}(COM_{P_i}s)$, where $\alpha^i$ is either d or d' depending on whether Step 2 was executed.

3.2. Each server $S_j$ determines the correct values for the commitments broadcast in the previous step by siding with the majority.

4. Share Transfer and Interpolation 4.1. Each $P_i$ computes $\theta_{i,j} = u(\alpha_i) + \alpha_i Q(\alpha_i) + (\alpha_i - \beta_j)R^{(j)}(\alpha_i)$ and $\phi_{i,j} = v(\alpha_i) + \alpha_i \gamma(\alpha_i) + (\alpha_i - \beta_j)\zeta^{(j)}(\alpha_i)$ and broadcasts $VSS_{P_i} = (\{ENC_{S_j}[\theta_{i,j},\phi_{i,j}]\}_{j=\xi}^{n^\xi})$ and $SIG_{P_i}(VSS_{P_i})$. (The idea is that for $S_j$, the servers in the old group mask u with the polynomial $xQ(x)+(x-\beta_j)R^{(j)}(x)$, and similarly for v.)

4.2. Each $S_j$ checks whether the values broadcast in Step 4.1 are correct given the publicly known Pedersen commitments. That is, $S_j$ check if $$g^{\theta_{i,j}}h^{\phi_{i,j}}? = g^{w(\alpha_i)}h^{v(\alpha_i)}\Pi_{k=0}^{\alpha^i-1}(g^{a_k}h^{v_k})^{\alpha_i k+s}(g^{r_k^{(j)}}h^{z_k^{(j)}})^{\alpha_i k+s}(g^{\overline{r_k^{(j)}}}h^{\overline{z_k^{(j)}}})^{-\beta_j \alpha_i^k}.$$

4.3. The new sharing polynomial is defined to be $u'(x) = u(x) + xQ(x)$, and similarly the new auxiliary polynomial is $v'(x) = v(x) + x\gamma(x)$. Since $(x-\beta_j)R^{(j)}(x)$ evaluates to zero at $x=\beta_j$, $S_j$ can deduce $u'(\beta_j)$ from the points on $u'(x)+(x-\beta_j)R^{(j)}(x)$ sent to him by the servers in the old group (and similarly for $v'(\beta_j)$). So each $S_j$ uses all the shares that passed the check in step 4.2 to interpolate his new share $u'(\beta_j)$, as well as $v'(\beta_j)$.

5. Data Erasure

Each $P_i$ in the old group erases all of their data.

The communication complexity of Secret-Redistribute is $O(n^2)$ field elements. It takes 6 rounds of communication (but only 5 if the degree of the sharing polynomial is not being lowered).

(4.4.4) Secret Opening

The following Secret-Open (t, P, [s]) protocol allows the servers to open a secret that has been shared with Pedersen commitments. It is assumed that the secret s has been shared with polynomial u and auxiliary polynomial v (both of degree d). If the $k^{th}$ coefficient of u is $u_k$ (and similarly for $v_k$), then it is assumed that the Pedersen commitments $\in_k = g^{u_k}h^{v_k}$ for each $k=0, \ldots, d$ are publicly known, with the Secret-Open protocol proceeding as follows:

1. Each server $P_i$ broadcasts his shares $SH_{P_i} = [u(\alpha_i), v(\alpha_i)]$ and $SIG_{P_i}(SH_{P_i})$.

2. Each server check for each pair of points $u(\alpha_j), v(\alpha_j)$ received in the previous step that $$g^{u(\alpha_j)}h^{v(\alpha_j)}? = \Pi_{k=0}^{d}(\in_k)^{\alpha_j^k}.$$

3. Each server uses all the points that passed the check in Step 2 to interpolate the secret $s=u(0)$.

The communication complexity of Secre-Open is O(n) field elements. It takes 1 round of communication. Multiple instances of Secret-Open can be invoked in parallel while still taking only 1 round of communication.

(4.5) Circuit Preparation (4.5.1) Generating Multiplication Triples

It is desirable to generate multiplication triples of shared secrets in a verifiable manner. The protocol for generating multiplication triples as described in Literature Reference No. 3 uses a degree d sharing of a random number r, together with a degree 2d sharing of the same value. Redistributing a 2d sharing would be problematic for the protocol of the present invention, so instead the system uses two random sharings [r] and [s], and when a degree 2d sharing of r is desired, the servers locally compute $[r]+x^d[s]$.

The following protocol (Multiplication-Triple(t, P, Corr, [a], [y], $\{[(r^{(i)}], [s^{(i)}], [\bar{r}^{(i)}], [\bar{s}^{(i)}]\}_{i=1}^{n}))$ uses the sharings [a], [y], $\{[r^{(i)}], [s^{(i)}], [\bar{r}^{(i)}], [\bar{s}^{(i)}]\}_{i=1}^{n}$ to generate (correct) sharings [b] and [c] such that c=ab. In what follows, the capital letter is used for the polynomial that shares the secret represented by the corresponding small letter (i.e., A(0)=a, $R^{(i)}(0)=r^{(i)}$, etc.). The auxiliary polynomials will have overlines (e.g., the auxiliary polynomial for A is $\bar{A}$). The following steps are performed in parallel for each server $P_i \in$ Corr:

1. Generating Multiplicands

Server $P_i$ randomly chooses two values $b^{(i)}$ and $\tilde{b}^{(i)}$ then invokes Secret-Share(t, $P_i$, $b^{(i)}$, P, Corr) and Secret-Share(t, $P_i$, $\tilde{b}^{(i)}$, P, Corr) in parallel. The polynomial used to share $b^{(i)}$ is denoted by $B^{(i)}$ (with auxiliary polynomial $\bar{B}^{(i)}$) and the polynomial used to share $\tilde{b}^{(i)}$ is denoted by $\tilde{B}^{(i)}$ (with auxiliary polynomial $\bar{\tilde{B}}^{(i)}$). If server $P_i$ is added to Corr in the invocation of Secret-Share, then the following steps are not performed for sever $P_i$.

2. Opening Masked Products 2.1. Each server $P_j \notin$ Corr broadcasts shares of $[a][b] + [r^{(i)}] + x^d[s^{(i)}]$ and [y], together with corresponding shares of auxiliary polynomials:

$$\theta_j = A(\alpha_j)B^{(i)}(\alpha_j) + R^{(i)}(\alpha_j) + \alpha_j^d S^{(i)}(\alpha_j),$$

$$\phi_j = \bar{A}(\alpha_j)B^{(i)}(\alpha_j) + \bar{R}^{(i)}(\alpha_j) + \alpha_j^d \bar{S}^{(i)}(\alpha_j),$$

$$Y(\alpha_j), \bar{Y}(\alpha_j), SIG_{P_j}(\theta_j, \phi_j, Y(\alpha_j), \bar{Y}(\alpha_j)).$$

The shares of [y] are not used until Step 5.3. They are broadcast here simply to reduce round complexity.

2.2. Server $P_i$ checks for each $(\theta_j, \phi_j)$ broadcast in the previous step that $$g^{\theta_j}h^{\phi_j}? = (g^{A(\alpha_j)}h^{\bar{A}(\alpha_j)})^{B^{(i)}(\alpha_j)}g^{R^{(i)}(\alpha_j)}h^{\bar{R}^{(i)}(\alpha_j)}(g^{S^{(i)}(\alpha_j)}h^{\bar{S}^{(i)}(\alpha_j)})^{\alpha_j^d}.$$

Recall that $P_i$ can compute the Pedersen commitments to $P_j$'s shares of a, $r^{(i)}$, and $s^{(i)}$ using the publicly known commitments.

2.3. For any pair $(\theta_j, \phi_j)$ that did not pass the check in the previous step, $P_i$ broadcasts $$ACC_{P_i} = (P_i, \text{accuse}, P_j, B(\alpha_j), \bar{B}(\alpha_j), RAND_{i,j})$$

and $SIG_{P_i}(ACC_{P_i})$, where $RAND_{i,j}$ is the randomness used to encrypt $P_j$'s shares in the invocation of Secret-Share in Step 1.

2.4. If $P_i$ broadcast a correct accusation against $P_j$, (i.e., the values encrypt to the same message sent in the invocation of Secret-Share in Step 1 when the given randomness is used, and these values do not correspond to the values $(\theta_j, \phi_j)$ broadcast in Step 2.1) then $P_j$ is added to Corr. If $P_i$ broadcast an incorrect accusation against $P_j$, then $P_i$ is added to Corr.

3. Revealing Corrupt Players' Shares 3.1. The servers invoke one instance of GenPoly(t, P, Corr, 1, d−|Corr|) (i.e., this step is not run for each $P_i$, but rather once for all the $P_i$). This generates a polynomial M with auxiliary polynomial $\overline{M}$.

3.2. The polynomials W, $\overline{W}$, are defined by $W(x) = M(x)\Pi_{p_k \in Corr}(x-\alpha_k)$ and $\overline{W}(x) = \overline{M}(x)\Pi_{p_k \in Corr}(x-\alpha_k)$. Each server $P_j$ broadcasts $SH_j = [W(\alpha_j) + A(\alpha_j), W(\alpha_j) + R^{(i)}(\alpha_j), W(\alpha_j) + S^{(i)}(\alpha_j)\overline{W}(\alpha_j) + \overline{A}(\alpha_j), \overline{W}(\alpha_j) + \overline{R}^{(i)}(\alpha_j), \overline{W}(\alpha_j) + \overline{S}^{(i)}(\alpha_j)]$ and $SIG_{p_j}(SH_j)$.

3.3. In parallel with the previous Step, $P_i$ broadcasts $CorSh_{p_i} = \{B^{(i)}(\alpha_k)\}_{p_k \in Corr}$ along with $SIG_{p_i}(CorSh_{p_i})$.

3.4. Each server checks for each pair broadcast in Step 3.2 that it corresponds to the publicly known Pedersen commitments. The shares that pass the check are used to interpolate the shares of $[a]$, $[r^{(i)}]$, and $[s^{(i)}]$ belonging to servers in Corr, and together with the shares broadcast in the previous step, these are used to compute the corrupt servers' shares of $ab^{(i)} + r^{(i)}$.

4. Steps 2 and 3 are also performed to distribute and check shares of $[a][\tilde{b}] + [\tilde{r}^{(i)}] + x^d[\tilde{s}^{(i)}]$. The two executions of these steps are to be performed in parallel.

5. Checking Multiplication Triples 5.1. Each server interpolates $D^{(i)} = ab^{(i)} + r^{(i)}$ and $\tilde{D}^{(i)} = a\tilde{b}^{(i)} + \tilde{r}^{(i)}$ from the shares of all servers not in Corr that were broadcast in Step 2.1 and the shares of servers in Corr that were computed in Step 3.4.

5.2. Each server locally compute $[c^{(i)}] = D^{(i)} - [r^{(i)}]$s and $[\tilde{c}^{(i)}] = \tilde{D}^{(i)} - [\tilde{r}^{(i)}]$.

5.3. The servers interpolate y from the shares broadcast in Step 2.1 that correctly correspond to the commitments.

5.4. Invoke Secret-Open(t, P, $[\tilde{b}^{(i)}] + y[b^{(i)}]$) to get $\check{b}^{(i)} = \tilde{b}^{(i)} + yb^{(i)}$.

5.5. Invoke Secret-Open(t, P, $[\tilde{c}^{(i)}] + y[c^{(i)}] - \hat{b}^{(i)}[a]$) to get $z^{(i)} = \tilde{c}^{(i)} + yc^{(i)} - \check{b}^{(i)}a$.

5.6. If $z^{(i)} \neq 0$, then $P_i$ is added to Corr.

It is defined that $[b] = \Sigma[b^{(i)}]$ and $[c] = \Sigma[c^{(i)}]$, where the sums are taken over all i such that $P_i \notin Corr$. The servers locally compute these sharings (along with their Pedersen commitments), and the multiplication triple is taken to be ([a], [b], [c]) with c=ab. The communication complexity of Multiplication-Triple is $O(n^2)$. It takes 11 rounds of communication.

(4.5.2) Pre-Processing of the Circuit Representing the Computation

Figure 4:
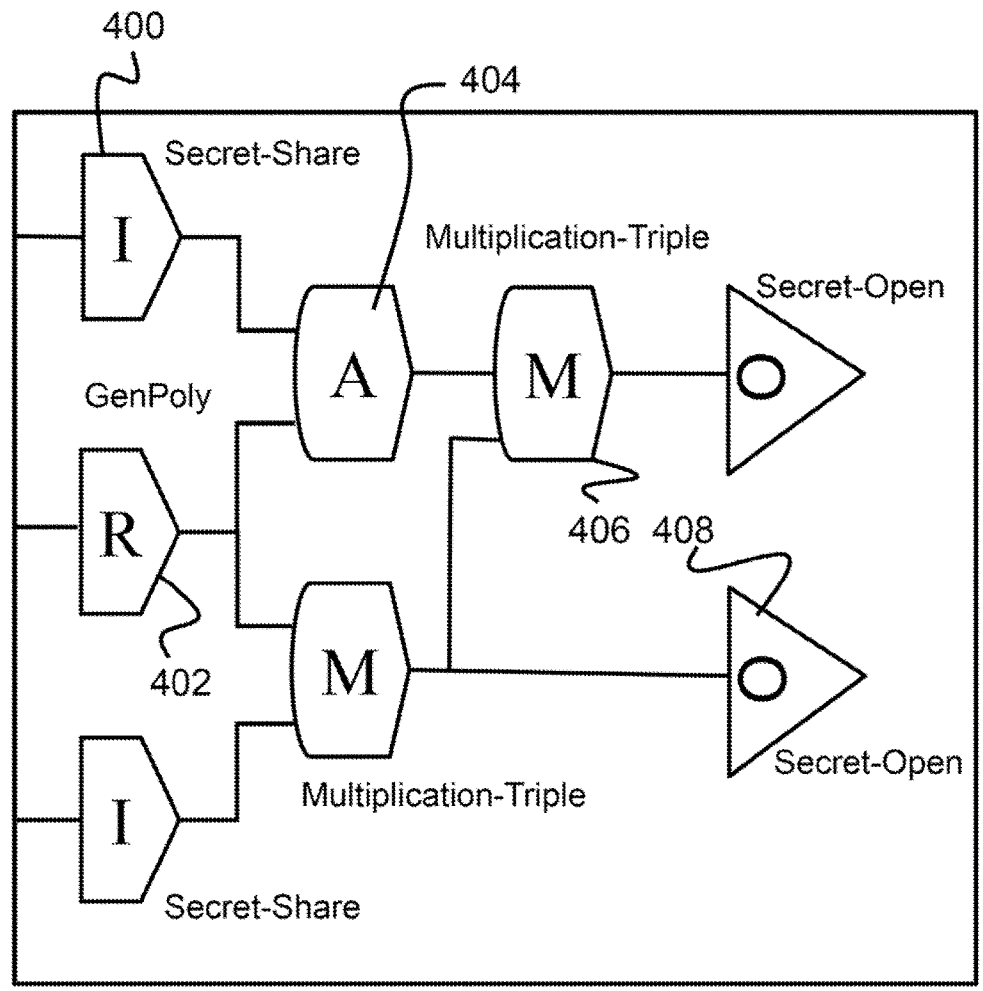
FIG. 4 is an example of an arithmetic circuit.

Let $c_I$, $c_R$, $c_M$, $c_O$, denote the number of input, random, multiplication, and output gates in the circuit (respectively), and define $C = c_I + c_R + c_M + c_O$. (Note that affine gates are not included in this sum). An example arithmetic circuit showing each type of gate is depicted in FIG. 4. Input 400, random 402, affine 404, multiplication 406, and output 408 gates are labeled with the letters I, R, A, M, and O, respectively. The protocols used in helping evaluate each gate are labeled next to the gates. Affine 404 gates can be evaluated via local computations without running an explicit protocol.

Note that although the protocol GenPoly described above was used to generate masking polynomials for redistributing secrets, it can also be used to generate sharings of random secrets. To do this, the constant term of the polynomial is taken to be the secret. The protocol for preprocessing different gates in the circuit is denoted as Pre-Process(t, P, Corr, Circ) and is outlined below.

1. For each input gate associated with server $P_D$, invoke Secret-Share($P_D$, s, P, Corr). This is to be done in parallel for each input gate.

2. In parallel with the previous step, invoke GenPoly(t, P, Corr, $c_R + (2+4n)c_M$) to generate $c_R + (2+4n)c_M$ sharings of random secrets. Associate one random sharing to each random gate.

3. Invoke Secret-Redistribute for each stored secret. Update P accordingly.

4. Associate 2+4n random sharings to each multiplication gate. Invoke $C_M$ instances of Multiplication-Triple in parallel so that one multiplication triple is associated with each multiplication gate.

The communication complexity of the Pre-Process protocol is $O(Cn^2)$. It takes 20 rounds of communication. For the invocation of Secret-Redistribute, it is assumed that some trusted third party (such as a network administrator) determines who the new group of shareholders will be. The Secret-Redistribute protocol is invoked in the middle of the Pre-Process protocol in order to minimize the number of intervening rounds between redistributions.

What is claimed is:

1. A system for mobile proactive secure multiparty computation amongst a plurality of servers, each server having one or more input gates, random gates, affine gates, multiplication gates, and output gates, the system comprising:
   one or more processors and a memory, the memory being a non-transitory computer-readable medium having executable instructions encoded thereon, such that upon execution of the instructions, the one or more processors perform operations of:
      generating by each server, secret sharings for each of its input gates using a Secret-Share protocol and distributing the secret sharings amongst the servers;
      generating by the servers sharings of inputs for random gates using a GenPoly protocol;
      generating by the servers sharings of multiplication triples for the multiplication gates using a Multiplication-Triple protocol;
      evaluating by the servers the affine gates;
      evaluating by the servers the multiplication gates using the multiplication triples and implementing a Secret-Open protocol;
      implementing by the servers a Secret-Redistribute protocol to re-randomize the secret sharing;
      implementing by the servers the Secret-Open protocol after a sharing for an output gate has been computed to reveal the secret;
   wherein each server includes a secure erasure protocol, the secure erasure protocol irretrievably erasing data maintained on the server;
   wherein the servers performing the operations can be changed while performing the operations; and
   wherein evaluating by the servers the multiplication gates using the multiplication triples and implementing a Secret-Open protocol further comprises operations of:
      by each server in P, locally adding its share of the first multiplicand input to the multiplication gate by the first multiplicand of the multiplication triple, and locally adding its share of the second multiplicand input to the multiplication gate by the second multiplicand of the multiplication triple;
      invoking a Secret-Open protocol twice to open the two sums computed in the previous operation; and
      by each server in P, computing a linear combination of its shares of the three values in the multiplication triple using the values opened in the previous operation, such that the resultant shares correspond to the product of the first and second multiplicand inputs to the multiplication gate.

2. The system as set forth in claim 1, wherein in generating by each server, secret sharings for each of its input gates using a Secret-Share protocol, the servers P allow a secret dealer $P_D$ to share a secret s by performing operations of:
- by dealer $P_D$, constructing a secret share polynomial that will hold shares of the secret s and an auxiliary polynomial;
- by dealer $P_D$, computing commitments for the polynomials;
- by dealer $P_D$, encrypting and broadcasting to each server in P encrypted shares of the polynomials, where the encrypted shares of the polynomials are encrypted using randomness;
- by dealer $P_D$, broadcasting to each server in P the commitments for the polynomials;
- by dealer $P_D$, broadcasting to each server in P an identity of dealer $P_D$;
- by dealer $P_D$, broadcasting to each server in P a signature of dealer $P_D$ on the data as broadcast by dealer $P_D$;
- by each server in P not known to be corrupt, decrypting the encrypted shares of the polynomials and verifying that the shares of the polynomials match the commitments;
- by any server $P_i$ in P not known to be corrupt who detects that the shares of the polynomials do not match the commitments, broadcasting an accusation that dealer $P_D$ is corrupt and a signature of $P_i$ on the accusation, the server $P_i$ broadcasting the accusation being designated as an accuser;
- by dealer $P_D$, broadcasting a defense for each properly signed accusation from an accuser, the defense including an identify of dealer $P_D$, a defense indication, an identity of the accuser, the shares of the polynomials that the dealer $P_D$ sent to the accuser, and the randomness used to encrypt the shares of the polynomials; and
- by each server in P, determining if the defense correctly rebuts the accusation, such that for each accusation that was rebutted with a correct defense, the accuser is added to the list of servers in P known to be corrupt, and such that if any accusation was not correctly rebutted, dealer $P_D$ is added to the list of servers known to be corrupt.

3. The system as set forth in claim 1, wherein generating by the servers sharings of inputs for random gates using a GenPoly protocol, further comprises operations of:
- by each server in P not known to be corrupt, generating a number of random data polynomials and an auxiliary polynomials, collectively denoted as random and auxiliary polynomials;
- by each server in P not known to be corrupt, computing commitments for the random and auxiliary polynomials and encrypting shares of the random and auxiliary polynomials, where the encrypted shares of the random and auxiliary polynomials are encrypted using randomness, and generating a broadcast to each server in P, the broadcast having encrypted shares of the random and auxiliary polynomials, commitments for the random and auxiliary polynomials, an identity of the server $P_i$ sending the encrypted shares, and a signature of the server $P_i$ on the broadcast;
- by each server in P that did not generate a broadcast, adding the server to the list of servers known to be corrupt;
- by each server in P not known to be corrupt, decrypting the encrypted shares of the random and auxiliary polynomials and verifying that the shares of the random and auxiliary polynomials match the commitments;
- by any server $P_i$ in P not known to be corrupt who detects that the shares of the random and auxiliary polynomials do not match the commitments, broadcasting an accusation that the server that sent the shares is corrupt and a signature of $P_i$ on the accusation, the server $P_i$ broadcasting the accusation being designated as an accuser and the server being accused as being corrupt is designated as an accused server;
- broadcasting a defense by the accused server for each properly signed accusation from server $P_i$, the defense including an identity of the accused server, a defense indication, an identity of the accuser, the shares of the random and auxiliary polynomials that the accused server sent to the accuser, and the randomness used to encrypt the shares of the random and auxiliary polynomials;
- by each server in P, determining if the defense correctly rebuts the accusation, such that for each accusation that was rebutted with a correct defense, the accuser is added to the list of servers in P known to be corrupt, and such that if any accusation was not correctly rebutted, the accused server is added to the list of servers known to be corrupt; and
- by each server in P, multiplying the shares of the random and auxiliary polynomials by a matrix to generate output random polynomial shares and output auxiliary polynomial shares, and generating commitments for the output random polynomial shares and output auxiliary polynomial shares.

4. The system as set forth in claim 1, wherein generating by the servers sharings of multiplication triples for the multiplication gates using a Multiplication-Triple protocol further comprises operations of:
- a. by each server in P, taking as input to the protocol a share of a first multiplicand, a share of a random coin, 2n shares of random values, and 2n shares of complementary random values (such that two random values and two complementary random values are assigned to each server in P), along with the shares of the auxiliary polynomials and commitments corresponding to the above shares;
- b. by each server in P, selecting a random second multiplicand and complementary second multiplicand, and invoking two instances of a Secret-Share protocol to share these values;
- c. for each server $P_i$ not known to be corrupt, performing the following operations:
  - i. by each server in P not known to be corrupt, broadcasting the product of its share of the input first multiplicand and the second multiplicand generated by $P_i$, masked by the two input shares of the two random values assigned to $P_i$, and broadcasting the same for the corresponding auxiliary values;
  - ii. by each server in P not known to be corrupt, broadcasting its input share of the random coin and its share of the auxiliary value corresponding to that random coin;
  - iii. by each server in P not known to be corrupt, broadcasting its signature on the data broadcast in operations i and ii;
  - iv. by server $P_i$, verifying that the masked shares broadcast in operation i match the commitments;
  - v. by server $P_i$, if server $P_i$ detects in operation iv that the shares broadcast by some server $P_j$ do not match the commitments, broadcasting an accusation against each server that the server that sent the shares is corrupt and a signature of $P_i$ on the accusation, the server $P_i$ broadcasting the accusation being designated as an accuser and the server being accused as being corrupt is designated as an accused server, each accusation including the identity of $P_i$, and accusation indication, the identity of $P_j$, $P_j$'s shares of the second multiplicand and corresponding auxiliary share that $P_i$ generated in the invocation of Secret-Share in operation b, the randomness that $P_i$ used to encrypt $P_j$'s shares in the invocation of Secret-Share in operation b;

vi. by server $P_j$, broadcasting $P_j$'s signature on the accusation in the previous operation;

vii. by each server in P, determining if the accusation by $P_i$ is correct, such that for each correct accusation, the accuser is added to the list of servers in P known to be corrupt, and such that if any accusation was not correct, $P_i$ is added to the list of servers known to be corrupt;

d. by each server in P, invoking GenPoly to generate shares of a random value, together with shares of an auxiliary value;

e. for each server $P_i$ not known to be corrupt, performing the following operations:

i. by each server in P not known to be corrupt, multiplying both of its shares generated in operation d by a share of a polynomial that evaluates to zero at the shares of the players that are known to be corrupt;

ii. by each server in P, adding its share generated in the previous operation by its share of the input first multiplicand, its share of the input random value assigned to $P_i$, and its share of the complementary random value assigned to $P_i$; and in addition, performing the same operations on the corresponding auxiliary shares;

iii. by each server in P, broadcasting the shares generated in the previous operation, together with a signature on the shares;

iv. by server $P_i$, broadcasting the shares of the players that are known to be corrupt of the random second multiplicand, together with $P_i$'s signature on those shares;

v. by each server in P, verifying that the shares broadcast in operation iii match the commitments;

vi. by each server in P, using the shares that passed the verification in the previous operation to compute the shares of the players that are known to be corrupt of the input first multiplicand, the input random value assigned to $P_i$, and the input complementary random value assigned to $P_i$; and then using these shares to compute the shares of the players that are known to be corrupt of the sum of the input random value assigned to $P_i$ and the product of the input first multiplicand with the second multiplicand generated by $P_i$ in operation b;

f. by each server in P, executing operations c, d, and e using the complementary random input values and complementary second multiplicands generated in operation b;

g. for each server $P_i$ not known to be corrupt, executing the following operations:

i. by each server in P, interpolating the sum of the input random value assigned to $P_i$ and the product of the input first multiplicand with the second multiplicand generated by $P_i$ in operation b (called $P_i$'s masked product) and interpolating the sum of the input complementary random value assigned to $P_i$ and the product of the input first multiplicand with the complementary second multiplicand generated by $P_i$ in operation b (called $P_i$'s complementary masked product) from the shares broadcast in operation c.i and interpolated in operation e.vi;

ii. by each server in P, locally subtracting its share of the input random value assigned to $P_i$ from $P_i$'s masked product and locally subtracting its share of the input complementary random value assigned to $P_i$ from $P_i$'s complementary masked product;

iii. by each server in P, interpolating the random coin from the shares broadcast in operation c.ii that match the commitments to those values;

iv. invoking a Secret-Open protocol to reveal a random linear combination of $P_i$'s second multiplicand and complementary second multiplicand;

v. invoking a Secret-Open protocol to reveal a check value that to determine if $P_i$ shared correct values;

vi. by each server in P, if the check value broadcast in the previous operation is not zero, then adding $P_i$ to the list of servers known to be corrupt;

h. by each server in P not known to be corrupt, defining its share of the final second multiplicand to be the sum of its shares of the second multiplicands generated by each server in P that is not known to be corrupt, and defining its share of the final product to be the sum of its non-complementary shares generated in operation g.ii from all servers in P that are not known to be corrupt; and i. by each server in P not known to be corrupt, taking as output its share of the input first multiplicand, its share of the final second multiplicand, and its share of the final product.

5. The system as set forth in claim 1, wherein implementing by the servers a Secret-Redistribute protocol to re-randomize the secret sharing further comprises operations of:

a. by each server in P, invoking GenPoly to generate shares of a refresh polynomial and one masking polynomial for each server in P';

b. if the threshold of corruption is decreasing, then performing the following operations:

i. by each server in P, invoking GenPoly to generate shares of a degree-lowering polynomial;

ii. by each server in P not known to be corrupt, broadcasting its share of the secret polynomial masked with the degree-lowering polynomial, broadcasting its share of the auxiliary secret polynomial masked with its share of the auxiliary degree-lowering polynomial, and broadcasting its signature on these two values;

iii. by each server in P, verifying that the shares broadcast in the previous operation match the corresponding commitments;

iv. by each server in P, adding each server whose shares did not pass the check in the previous operation to the list of servers known to be corrupt;

v. by each server in P, interpolating the masked polynomial from the shares that passed the check in operation iii, computing its share of the high-order terms of this polynomials, and taking its share of the new secret-sharing polynomial to be its share of the original polynomial subtracted by its share of the high-order terms;

vi. by each server in P, performing the previous operation for the corresponding auxiliary polynomials;

c. by each server in P that is not known to be corrupt, broadcasting its commitments for the secret sharing polynomial along with its signature on those commitments to the servers in P';

d. by each server in P', determining the correct value of the commitments by siding with the majority of the values broadcast in the previous operation;

e. by each server $P_i$ in P, computing for each server $P_j$ in P'$P_j$'s share of the secret sharing polynomial masked with $P_i$'s share of the refresh polynomial generated in operation a and masked with $P_i$'s share of a linear polynomial multiplied by $P_i$'s share of the masking polynomial assigned to $P_j$ generated in operation a; and computing the corresponding share of the auxiliary polynomial;

f. by each server in P, encrypting the shares computed in the previous operation with the keys for the corresponding servers in P' and broadcasting these encrypted shares, along with a signature on the encrypted shares;

g. by each server in P', decrypting the share broadcast in the previous operation and verifying that they match the corresponding commitments;

h. by each server in P', computing its share of the new secret sharing polynomial and auxiliary secret sharing polynomial by interpolating the shares sent in the previous operation; and i. by each server in P, erasing all of its old data.

6. The system as set forth in claim 1, wherein implementing by the servers the Secret-Open protocol after a sharing for an output gate has been computed to reveal the secret further comprises operations of:

by each server in P, broadcasting its share of the secret to be opened, its share of the corresponding auxiliary polynomial, and its signature on those shares;

by each server in P, checking that the shares broadcast in the previous operation match the commitments; and by each server in P, using the shares that passed the check in the previous operation to interpolate the secret.

7. The system as set forth in claim 1, further comprising an operation of running a plurality of Secret-Share protocols in parallel.

8. A computer program product for mobile proactive secure multiparty computation amongst a plurality of servers, each server having one or more input gates, random gates, affine gates, multiplication gates, and output gates, the computer program product comprising:

a non-transitory computer-readable medium having executable instructions encoded thereon, such that upon execution of the instructions by one or more processors, the one or more processors perform operations of:

generating by each server, secret sharings for each of its input gates using a Secret-Share protocol and distributing the secret sharings amongst the servers;

generating by the servers sharings of inputs for random gates using a GenPoly protocol;

generating by the servers sharings of multiplication triples for the multiplication gates using a Multiplication-Triple protocol;

evaluating by the servers the affine gates;

evaluating by the servers the multiplication gates using the multiplication triples and implementing a Secret-Open protocol;

implementing by the servers a Secret-Redistribute protocol to re-randomize the secret sharing;

implementing by the servers the Secret-Open protocol after a sharing for an output gate has been computed to reveal the secret;

wherein each server includes a secure erasure protocol, the secure erasure protocol irretrievably erasing data maintained on the server;

wherein the servers performing the operations can be changed while performing the operations; and wherein evaluating by the servers the multiplication gates using the multiplication triples and implementing a Secret-Open protocol further comprises operations of:

by each server in P, locally adding its share of the first multiplicand input to the multiplication gate by the first multiplicand of the multiplication triple, and locally adding its share of the second multiplicand input to the multiplication gate by the second multiplicand of the multiplication triple;

invoking a Secret-Open protocol twice to open the two sums computed in the previous operation; and by each server in P, computing a linear combination of its shares of the three values in the multiplication triple using the values opened in the previous operation, such that the resultant shares correspond to the product of the first and second multiplicand inputs to the multiplication gate.

9. A computer implemented method for processing imagery, the method comprising an act of:

causing one or more processors to execute instructions encoded on a non-transitory computer-readable medium, such that upon execution, the one or more processors perform operations of:

generating by each server, secret sharings for each of its input gates using a Secret-Share protocol and distributing the secret sharings amongst the servers;

generating by the servers sharings of inputs for random gates using a GenPoly protocol;

generating by the servers sharings of multiplication triples for the multiplication gates using a Multiplication-Triple protocol;

evaluating by the servers the affine gates;

evaluating by the servers the multiplication gates using the multiplication triples and implementing a Secret-Open protocol;

implementing by the servers a Secret-Redistribute protocol to re-randomize the secret sharing;

implementing by the servers the Secret-Open protocol after a sharing for an output gate has been computed to reveal the secret;

wherein each server includes a secure erasure protocol, the secure erasure protocol irretrievably erasing data maintained on the server;

wherein the servers performing the operations can be changed while performing the operations; and wherein evaluating by the servers the multiplication gates using the multiplication triples and implementing a Secret-Open protocol further comprises operations of:

by each server in P, locally adding its share of the first multiplicand input to the multiplication gate by the first multiplicand of the multiplication triple, and locally adding its share of the second multiplicand input to the multiplication gate by the second multiplicand of the multiplication triple;

invoking a Secret-Open protocol twice to open the two sums computed in the previous operation; and by each server in P, computing a linear combination of its shares of the three values in the multiplication triple using the values opened in the previous operation, such that the resultant shares correspond to the product of the first and second multiplicand inputs to the multiplication gate.

10. The computer implemented method as set forth in claim 9, wherein in generating by each server, secret sharings for each of its input gates using a Secret-Share protocol, the servers P allow a secret dealer $P_D$ to share a secret s by performing operations of:
- by dealer $P_D$, constructing a secret share polynomial that will hold shares of the secret s and an auxiliary polynomial;
- by dealer $P_D$, computing commitments for the polynomials;
- by dealer $P_D$, encrypting and broadcasting to each server in P encrypted shares of the polynomials, where the encrypted shares of the polynomials are encrypted using randomness;
- by dealer $P_D$, broadcasting to each server in P the commitments for the polynomials;
- by dealer $P_D$, broadcasting to each server in P an identity of dealer $P_D$;
- by dealer $P_D$, broadcasting to each server in P a signature of dealer $P_D$ on the data as broadcast by dealer $P_D$;
- by each server in P not known to be corrupt, decrypting the encrypted shares of the polynomials and verifying that the shares of the polynomials match the commitments;
- by any server $P_i$ in P not known to be corrupt who detects that the shares of the polynomials do not match the commitments, broadcasting an accusation that dealer $P_D$ is corrupt and a signature of $P_i$ on the accusation, the server $P_i$ broadcasting the accusation being designated as an accuser;
- by dealer $P_D$, broadcasting a defense for each properly signed accusation from an accuser, the defense including an identify of dealer $P_D$, a defense indication, an identity of the accuser, the shares of the polynomials that the dealer $P_D$ sent to the accuser, and the randomness used to encrypt the shares of the polynomials; and
- by each server in P, determining if the defense correctly rebuts the accusation, such that for each accusation that was rebutted with a correct defense, the accuser is added to the list of servers in P known to be corrupt, and such that if any accusation was not correctly rebutted, dealer $P_D$ is added to the list of servers known to be corrupt.

11. The computer implemented method as set forth in claim 9, wherein generating by the servers sharings of inputs for random gates using a GenPoly protocol, further comprises operations of:
- by each server in P not known to be corrupt, generating a number of random data polynomials and an auxiliary polynomials, collectively denoted as random and auxiliary polynomials;
- by each server in P not known to be corrupt, computing commitments for the random and auxiliary polynomials and encrypting shares of the random and auxiliary polynomials, where the encrypted shares of the random and auxiliary polynomials are encrypted using randomness, and generating a broadcast to each server in P, the broadcast having encrypted shares of the random and auxiliary polynomials, commitments for the random and auxiliary polynomials, an identity of the server $P_i$ sending the encrypted shares, and a signature of the server $P_i$ on the broadcast;
- by each server in P that did not generate a broadcast, adding the server to the list of servers known to be corrupt;
- by each server in P not known to be corrupt, decrypting the encrypted shares of the random and auxiliary polynomials and verifying that the shares of the random and auxiliary polynomials match the commitments;
- by any server $P_i$ in P not known to be corrupt who detects that the shares of the random and auxiliary polynomials do not match the commitments, broadcasting an accusation that the server that sent the shares is corrupt and a signature of $P_i$ on the accusation, the server $P_i$ broadcasting the accusation being designated as an accuser and the server being accused as being corrupt is designated as an accused server;
- broadcasting a defense by the accused server for each properly signed accusation from server $P_i$, the defense including an identity of the accused server, a defense indication, an identity of the accuser, the shares of the random and auxiliary polynomials that the accused server sent to the accuser, and the randomness used to encrypt the shares of the random and auxiliary polynomials;
- by each server in P, determining if the defense correctly rebuts the accusation, such that for each accusation that was rebutted with a correct defense, the accuser is added to the list of servers in P known to be corrupt, and such that if any accusation was not correctly rebutted, the accused server is added to the list of servers known to be corrupt; and
- by each server in P, multiplying the shares of the random and auxiliary polynomials by a matrix to generate output random polynomial shares and output auxiliary polynomial shares, and generating commitments for the output random polynomial shares and output auxiliary polynomial shares.

12. The computer implemented method as set forth in claim 9, wherein generating by the servers sharings of multiplication triples for the multiplication gates using a Multiplication-Triple protocol further comprises operations of:
a. by each server in P, taking as input to the protocol a share of a first multiplicand, a share of a random coin, 2n shares of random values, and 2n shares of complementary random values (such that two random values and two complementary random values are assigned to each server in P), along with the shares of the auxiliary polynomials and commitments corresponding to the above shares;
b. by each server in P, selecting a random second multiplicand and complementary second multiplicand, and invoking two instances of a Secret-Share protocol to share these values;
c. for each server $P_i$ not known to be corrupt, performing the following operations:
   i. by each server in P not known to be corrupt, broadcasting the product of its share of the input first multiplicand and the second multiplicand generated by $P_i$, masked by the two input shares of the two random values assigned to $P_i$, and broadcasting the same for the corresponding auxiliary values;
   ii. by each server in P not known to be corrupt, broadcasting its input share of the random coin and its share of the auxiliary value corresponding to that random coin;

iii. by each server in P not known to be corrupt, broadcasting its signature on the data broadcast in operations 6.c.i and 6.c.ii;
iv. by server $P_i$, verifying that the masked shares broadcast in operation 6.c.i match the commitments;
v. by server $P_i$, if server $P_i$ detects in operation 6.c.iv that the shares broadcast by some server $P_j$ do not match the commitments, broadcasting an accusation against each server that the server that sent the shares is corrupt and a signature of $P_i$ on the accusation, the server $P_i$ broadcasting the accusation being designated as an accuser and the server being accused as being corrupt is designated as an accused server, each accusation including the identity of $P_i$, and accusation indication, the identity of $P_j$, $P_j$'s shares of the second multiplicand and corresponding auxiliary share that $P_i$ generated in the invocation of Secret-Share in operation 6.b, the randomness that $P_i$ used to encrypt $P_j$'s shares in the invocation of Secret-Share in operation 6.b;
vi. by server $P_i$, broadcasting $P_i$'s signature on the accusation in the previous operation;
vii. by each server in P, determining if the accusation by $P_i$ is correct, such that for each correct accusation, the accuser is added to the list of servers in P known to be corrupt, and such that if any accusation was not correct, $P_i$ is added to the list of servers known to be corrupt;
d. by each server in P, invoking GenPoly to generate shares of a random value, together with shares of an auxiliary value;
e. for each server $P_i$ not known to be corrupt, performing the following operations:
i. by each server in P not known to be corrupt, multiplying both of its shares generated in operation 6.d by a share of a polynomial that evaluates to zero at the shares of the players that are known to be corrupt;
ii. by each server in P, adding its share generated in the previous operation by its share of the input first multiplicand, its share of the input random value assigned to $P_i$, and its share of the complementary random value assigned to $P_i$; and in addition, performing the same operations on the corresponding auxiliary shares;
iii. by each server in P, broadcasting the shares generated in the previous operation, together with a signature on the shares;
iv. by server $P_i$, broadcasting the shares of the players that are known to be corrupt of the random second multiplicand, together with $P_i$'s signature on those shares;
v. by each server in P, verifying that the shares broadcast in operation 6.e.iii match the commitments;
vi. by each server in P, using the shares that passed the verification in the previous operation to compute the shares of the players that are known to be corrupt of the input first multiplicand, the input random value assigned to $P_i$, and the input complementary random value assigned to $P_i$; and then using these shares to compute the shares of the players that are known to be corrupt of the sum of the input random value assigned to $P_i$ and the product of the input first multiplicand with the second multiplicand generated by $P_i$ in operation 6.b;
f. by each server in P, executing operations 6.c, 6.d, and 6.e using the complementary random input values and complementary second multiplicands generated in operation 6.b;
g. for each server $P_i$ not known to be corrupt, executing the following operations:
i. by each server in P, interpolating the sum of the input random value assigned to $P_i$ and the product of the input first multiplicand with the second multiplicand generated by $P_i$ in operation 6.b (called $P_i$'s masked product) and interpolating the sum of the input complementary random value assigned to $P_i$ and the product of the input first multiplicand with the complementary second multiplicand generated by $P_i$ in operation 6.b (called $P_i$'s complementary masked product) from the shares broadcast in operation 6.c.i and interpolated in operation 6.e.vi;
ii. by each server in P, locally subtracting its share of the input random value assigned to $P_i$ from $P_i$'s masked product and locally subtracting its share of the input complementary random value assigned to $P_i$ from $P_i$'s complementary masked product;
iii. by each server in P, interpolating the random coin from the shares broadcast in operation 6.c.ii that match the commitments to those values;
iv. invoking a Secret-Open protocol to reveal a random linear combination of $P_i$'s second multiplicand and complementary second multiplicand;
v. invoking a Secret-Open protocol to reveal a check value that to determine if $P_i$ shared correct values;
vi. by each server in P, if the check value broadcast in the previous operation is not zero, then adding $P_i$ to the list of servers known to be corrupt;
h. by each server in P not known to be corrupt, defining its share of the final second multiplicand to be the sum of its shares of the second multiplicands generated by each server in P that is not known to be corrupt, and defining its share of the final product to be the sum of its non-complementary shares generated in operation 6.g.ii from all servers in P that are not known to be corrupt; and
i. by each server in P not known to be corrupt, taking as output its share of the input first multiplicand, its share of the final second multiplicand, and its share of the final product.

13. The computer implemented method as set forth in claim 9, wherein implementing by the servers a Secret-Redistribute protocol to re-randomize the secret sharing further comprises operations of:
a. by each server in P, invoking GenPoly to generate shares of a refresh polynomial and one masking polynomial for each server in P';
b. if the threshold of corruption is decreasing, then performing the following operations:
i. by each server in P, invoking GenPoly to generate shares of a degree-lowering polynomial;
ii. by each server in P not known to be corrupt, broadcasting its share of the secret polynomial masked with the degree-lowering polynomial, broadcasting its share of the auxiliary secret polynomial masked with its share of the auxiliary degree-lowering polynomial, and broadcasting its signature on these two values;
iii. by each server in P, verifying that the shares broadcast in the previous operation match the corresponding commitments;

iv. by each server in P, adding each server whose shares did not pass the check in the previous operation to the list of servers known to be corrupt;

v. by each server in P, interpolating the masked polynomial from the shares that passed the check in operation 8.b.iii, computing its share of the high-order terms of this polynomials, and taking its share of the new secret-sharing polynomial to be its share of the original polynomial subtracted by its share of the high-order terms;

vi. by each server in P, performing the previous operation for the corresponding auxiliary polynomials;

c. by each server in P that is not known to be corrupt, broadcasting its commitments for the secret sharing polynomial along with its signature on those commitments to the servers in P';

d. by each server in P', determining the correct value of the commitments by siding with the majority of the values broadcast in the previous operation;

e. by each server $P_i$ in P, computing for each server $P_j$ in P' $P_i$'s share of the secret sharing polynomial masked with $P_i$'s share of the refresh polynomial generated in operation 8.a and masked with $P_i$'s share of a linear polynomial multiplied by $P_i$'s share of the masking polynomial assigned to $P_j$ generated in operation 8.a; and computing the corresponding share of the auxiliary polynomial;

f. by each server in P, encrypting the shares computed in the previous operation with the keys for the corresponding servers in P' and broadcasting these encrypted shares, along with a signature on the encrypted shares;

g. by each server in P', decrypting the share broadcast in the previous operation and verifying that they match the corresponding commitments;

h. by each server in P', computing its share of the new secret sharing polynomial and auxiliary secret sharing polynomial by interpolating the shares sent in the previous operation; and i. by each server in P, erasing all of its old data.

14. The computer implemented method as set forth in claim 9, wherein implementing by the servers the Secret-Open protocol after a sharing for an output gate has been computed to reveal the secret further comprises operations of:

by each server in P, broadcasting its share of the secret to be opened, its share of the corresponding auxiliary polynomial, and its signature on those shares;

by each server in P, checking that the shares broadcast in the previous operation match the commitments; and by each server in P, using the shares that passed the check in the previous operation to interpolate the secret.

15. A system for mobile proactive secure multiparty computation amongst a plurality of servers, each server having one or more input gates, random gates, affine gates, multiplication gates, and output gates, the system comprising:

one or more processors and a memory, the memory being a non-transitory computer-readable medium having executable instructions encoded thereon, such that upon execution of the instructions, the one or more processors perform operations of:

generating by each server, secret sharings for each of its input gates using a Secret-Share protocol and distributing the secret sharings amongst the servers;

generating by the servers sharings of inputs for random gates using a GenPoly protocol;

generating by the servers sharings of multiplication triples for the multiplication gates using a Multiplication-Triple protocol;

evaluating by the servers the affine gates;

evaluating by the servers the multiplication gates using the multiplication triples and implementing a Secret-Open protocol;

implementing by the servers a Secret-Redistribute protocol to re-randomize the secret sharing; and implementing by the servers the Secret-Open protocol after a sharing for an output gate has been computed to reveal the secret;

wherein in generating by each server, secret sharings for each of its input gates using a Secret-Share protocol, the servers P allow a secret dealer $P_D$ to share a secret s by performing operations of:

by dealer $P_D$, constructing a secret share polynomial that will hold shares of the secret s and an auxiliary polynomial;

by dealer $P_D$, computing commitments for the polynomials;

by dealer $P_D$, encrypting and broadcasting to each server in P encrypted shares of the polynomials, where the encrypted shares of the polynomials are encrypted using randomness;

by dealer $P_D$, broadcasting to each server in P the commitments for the polynomials;

by dealer $P_D$, broadcasting to each server in P an identity of dealer $P_D$;

by dealer $P_D$, broadcasting to each server in P a signature of dealer $P_D$ on the data as broadcast by dealer $P_D$;

by each server in P not known to be corrupt, decrypting the encrypted shares of the polynomials and verifying that the shares of the polynomials match the commitments;

by any server $P_i$ in P not known to be corrupt who detects that the shares of the polynomials do not match the commitments, broadcasting an accusation that dealer $P_D$ is corrupt and a signature of $P_i$ on the accusation, the server $P_i$ broadcasting the accusation being designated as an accuser;

by dealer $P_D$, broadcasting a defense for each properly signed accusation from an accuser, the defense including an identify of dealer $P_D$, a defense indication, an identity of the accuser, the shares of the polynomials that the dealer $P_D$ sent to the accuser, and the randomness used to encrypt the shares of the polynomials; and by each server in P, determining if the defense correctly rebuts the accusation, such that for each accusation that was rebutted with a correct defense, the accuser is added to the list of servers in P known to be corrupt, and such that if any accusation was not correctly rebutted, dealer $P_D$ is added to the list of servers known to be corrupt;

wherein generating by the servers sharings of inputs for random gates using a GenPoly protocol, further comprises operations of:

by each server in P not known to be corrupt, generating a number of random data polynomials and an auxiliary polynomials, collectively denoted as random and auxiliary polynomials;

by each server in P not known to be corrupt, computing commitments for the random and auxiliary polynomials and encrypting shares of the random and auxiliary polynomials, where the encrypted shares of the random and auxiliary polynomials are encrypted using randomness, and generating a broadcast to each server in P, the broadcast having encrypted shares of the random and auxiliary polynomials, commitments for the random and auxiliary polynomials, an identity of the server $P_i$ sending the encrypted shares, and a signature of the server $P_i$ on the broadcast;

by each server in P that did not generate a broadcast, adding the server to the list of servers known to be corrupt;

by each server in P not known to be corrupt, decrypting the encrypted shares of the random and auxiliary polynomials and verifying that the shares of the random and auxiliary polynomials match the commitments;

by any server $P_i$ in P not known to be corrupt who detects that the shares of the random and auxiliary polynomials do not match the commitments, broadcasting an accusation that the server that sent the shares is corrupt and a signature of $P_i$ on the accusation, the server $P_i$ broadcasting the accusation being designated as an accuser and the server being accused as being corrupt is designated as an accused server;

broadcasting a defense by the accused server for each properly signed accusation from server $P_i$, the defense including an identity of the accused server, a defense indication, an identity of the accuser, the shares of the random and auxiliary polynomials that the accused server sent to the accuser, and the randomness used to encrypt the shares of the random and auxiliary polynomials;

by each server in P, determining if the defense correctly rebuts the accusation, such that for each accusation that was rebutted with a correct defense, the accuser is added to the list of servers in P known to be corrupt, and such that if any accusation was not correctly rebutted, the accused server is added to the list of servers known to be corrupt; and by each server in P, multiplying the shares of the random and auxiliary polynomials by a matrix to generate output random polynomial shares and output auxiliary polynomial shares, and generating commitments for the output random polynomial shares and output auxiliary polynomial shares;

wherein generating by the servers sharings of multiplication triples for the multiplication gates using a Multiplication-Triple protocol further comprises operations of:

a. by each server in P, taking as input to the protocol a share of a first multiplicand, a share of a random coin, 2n shares of random values, and 2n shares of complementary random values (such that two random values and two complementary random values are assigned to each server in P), along with the shares of the auxiliary polynomials and commitments corresponding to the above shares;

b. by each server in P, selecting a random second multiplicand and complementary second multiplicand, and invoking two instances of a Secret-Share protocol to share these values;

c. for each server $P_i$ not known to be corrupt, performing the following operations:
   i. by each server in P not known to be corrupt, broadcasting the product of its share of the input first multiplicand and the second multiplicand generated by $P_i$, masked by the two input shares of the two random values assigned to $P_i$, and broadcasting the same for the corresponding auxiliary values;
   ii. by each server in P not known to be corrupt, broadcasting its input share of the random coin and its share of the auxiliary value corresponding to that random coin;
   iii. by each server in P not known to be corrupt, broadcasting its signature on the data broadcast in operations 6.c.i and 6.c.ii;
   iv. by server $P_i$, verifying that the masked shares broadcast in operation 6.c.i match the commitments;
   v. by server $P_i$, if server $P_i$ detects in operation 6.c.iv that the shares broadcast by some server $P_j$ do not match the commitments, broadcasting an accusation against each server that the server that sent the shares is corrupt and a signature of $P_i$ on the accusation, the server $P_i$ broadcasting the accusation being designated as an accuser and the server being accused as being corrupt is designated as an accused server, each accusation including the identity of $P_i$, and accusation indication, the identity of $P_j$, $P_j$'s shares of the second multiplicand and corresponding auxiliary share that $P_i$ generated in the invocation of Secret-Share in operation 6.b, the randomness that $P_i$ used to encrypt $P_j$'s shares in the invocation of Secret-Share in operation 6.b;
   vi. by server $P_i$, broadcasting $P_i$'s signature on the accusation in the previous operation;
   vii. by each server in P, determining if the accusation by $P_i$ is correct, such that for each correct accusation, the accuser is added to the list of servers in P known to be corrupt, and such that if any accusation was not correct, $P_i$ is added to the list of servers known to be corrupt;

d. by each server in P, invoking GenPoly to generate shares of a random value, together with shares of an auxiliary value;

e. for each server $P_i$ not known to be corrupt, performing the following operations:
   i. by each server in P not known to be corrupt, multiplying both of its shares generated in operation 6.d by a share of a polynomial that evaluates to zero at the shares of the players that are known to be corrupt;
   ii. by each server in P, adding its share generated in the previous operation by its share of the input first multiplicand, its share of the input random value assigned to $P_i$, and its share of the complementary random value assigned to $P_i$; and in addition, performing the same operations on the corresponding auxiliary shares;
   iii. by each server in P, broadcasting the shares generated in the previous operation, together with a signature on the shares;
   iv. by server $P_i$, broadcasting the shares of the players that are known to be corrupt of the random second multiplicand, together with $P_i$'s signature on those shares;
   v. by each server in P, verifying that the shares broadcast in operation 6.e.iii match the commitments;
   vi. by each server in P, using the shares that passed the verification in the previous operation to compute the shares of the players that are known to be corrupt of the input first multiplicand, the input random value assigned to $P_i$, and the input complementary random value assigned to $P_i$; and then using these shares to compute the shares of the players that are known to be corrupt of the sum of the input random value assigned to $P_i$ and the product of the input first multiplicand with the second multiplicand generated by $P_i$ in operation 6.b;

f. by each server in P, executing operations 6.c, 6.d, and 6.e using the complementary random input values and complementary second multiplicands generated in operation 6.b;

g. for each server $P_i$ not known to be corrupt, executing the following operations:
  i. by each server in P, interpolating the sum of the input random value assigned to $P_i$ and the product of the input first multiplicand with the second multiplicand generated by $P_i$ in operation 6.b (called $P_i$'s masked product) and interpolating the sum of the input complementary random value assigned to $P_i$ and the product of the input first multiplicand with the complementary second multiplicand generated by $P_i$ in operation 6.b (called $P_i$'s complementary masked product) from the shares broadcast in operation 6.c.i and interpolated in operation 6.e.vi;
  ii. by each server in P, locally subtracting its share of the input random value assigned to $P_i$ from $P_i$'s masked product and locally subtracting its share of the input complementary random value assigned to $P_i$ from $P_i$'s complementary masked product;
  iii. by each server in P, interpolating the random coin from the shares broadcast in operation 6.c.ii that match the commitments to those values;
  iv. invoking a Secret-Open protocol to reveal a random linear combination of $P_i$'s second multiplicand and complementary second multiplicand;
  v. invoking a Secret-Open protocol to reveal a check value that to determine if $P_i$ shared correct values;
  vi. by each server in P, if the check value broadcast in the previous operation is not zero, then adding $P_i$ to the list of servers known to be corrupt;

h. by each server in P not known to be corrupt, defining its share of the final second multiplicand to be the sum of its shares of the second multiplicands generated by each server in P that is not known to be corrupt, and defining its share of the final product to be the sum of its non-complementary shares generated in operation 6.g.ii from all servers in P that are not known to be corrupt; and i. by each server in P not known to be corrupt, taking as output its share of the input first multiplicand, its share of the final second multiplicand, and its share of the final product;

wherein evaluating by the servers the multiplication gates using the multiplication triples and implementing a Secret-Open protocol further comprises operations of:
by each server in P, locally adding its share of the first multiplicand input to the multiplication gate by the first multiplicand of the multiplication triple, and locally adding its share of the second multiplicand input to the multiplication gate by the second multiplicand of the multiplication triple;
invoking a Secret-Open protocol twice to open the two sums computed in the previous operation; and
by each server in P, computing a linear combination of its shares of the three values in the multiplication triple using the values opened in the previous operation, such that the resultant shares correspond to the product of the first and second multiplicand inputs to the multiplication gate;

wherein implementing by the servers a Secret-Redistribute protocol to re-randomize the secret sharing further comprises operations of:
a. by each server in P, invoking GenPoly to generate shares of a refresh polynomial and one masking polynomial for each server in P';
b. if the threshold of corruption is decreasing, then performing the following operations:
  i. by each server in P, invoking GenPoly to generate shares of a degree-lowering polynomial;
  ii. by each server in P not known to be corrupt, broadcasting its share of the secret polynomial masked with the degree-lowering polynomial, broadcasting its share of the auxiliary secret polynomial masked with its share of the auxiliary degree-lowering polynomial, and broadcasting its signature on these two values;
  iii. by each server in P, verifying that the shares broadcast in the previous operation match the corresponding commitments;
  iv. by each server in P, adding each server whose shares did not pass the check in the previous operation to the list of servers known to be corrupt;
  v. by each server in P, interpolating the masked polynomial from the shares that passed the check in operation 8.b.iii, computing its share of the high-order terms of this polynomials, and taking its share of the new secret-sharing polynomial to be its share of the original polynomial subtracted by its share of the high-order terms;
  vi. by each server in P, performing the previous operation for the corresponding auxiliary polynomials;
c. by each server in P that is not known to be corrupt, broadcasting its commitments for the secret sharing polynomial along with its signature on those commitments to the servers in P';
d. by each server in P', determining the correct value of the commitments by siding with the majority of the values broadcast in the previous operation;
e. by each server $P_i$ in P, computing for each server $P_j$ in P' $P_i$'s share of the secret sharing polynomial masked with $P_i$'s share of the refresh polynomial generated in operation 8.a and masked with $P_i$'s share of a linear polynomial multiplied by $P_i$'s share of the masking polynomial assigned to $P_j$ generated in operation 8.a; and computing the corresponding share of the auxiliary polynomial;
f. by each server in P, encrypting the shares computed in the previous operation with the keys for the corresponding servers in P' and broadcasting these encrypted shares, along with a signature on the encrypted shares;
g. by each server in P', decrypting the share broadcast in the previous operation and verifying that they match the corresponding commitments;

h. by each server in P', computing its share of the new secret sharing polynomial and auxiliary secret sharing polynomial by interpolating the shares sent in the previous operation; and i. by each server in P, erasing all of its old data;

wherein implementing by the servers the Secret-Open protocol after a sharing for an output gate has been computed to reveal the secret further comprises operations of:

by each server in P, broadcasting its share of the secret to be opened, it share of the corresponding auxiliary polynomial, and its signature on those shares;

by each server in P, checking that the shares broadcast in the previous operation match the commitments;

by each server in P, using the shares the passed the check in the previous operation to interpolate the secret; and wherein each server includes a secure erasure protocol, the secure erasure protocol irretrievably erasing data maintained on the server.

* * * * *